(12) United States Patent
Wakamiya et al.

(10) Patent No.: US 8,118,898 B2
(45) Date of Patent: Feb. 21, 2012

(54) SPINOUS SILICA-BASED SOL AND METHOD OF PRODUCING THE SAME

(75) Inventors: Yoshinori Wakamiya, Kitakyushu (JP);
Hiroyasu Nishida, Kitakyushu (JP);
Yuji Tawarazako, Kitakyushu (JP);
Kazuaki Inoue, Kitakyushu (JP);
Osamu Yoshida, Kitakyushu (JP); Akira Nakashima, Kitakyushu (JP)

(73) Assignee: JGC Catalysts and Chemicals Ltd., Kanagawa (JP)

( * ) Notice: Subject to any disclaimer, the term of this patent is extended or adjusted under 35 U.S.C. 154(b) by 947 days.

(21) Appl. No.: 11/907,318

(22) Filed: Oct. 11, 2007

(65) Prior Publication Data
US 2008/0086951 A1    Apr. 17, 2008

(30) Foreign Application Priority Data

Oct. 12, 2006    (JP) .................... 2006-279204
Dec. 11, 2006    (JP) .................... 2006-333574

(51) Int. Cl.
*C09G 1/04*    (2006.01)
*B01F 3/12*    (2006.01)
*C01B 33/12*    (2006.01)

(52) U.S. Cl. ............... 51/308; 516/9; 516/79; 516/80; 423/335; 423/338; 423/339; 502/8

(58) Field of Classification Search .................. None
See application file for complete search history.

(56) References Cited

U.S. PATENT DOCUMENTS

| | | | |
|---|---|---|---|
| 4,911,903 A * | 3/1990 | Unger et al. | 423/335 |
| 5,597,512 A * | 1/1997 | Watanabe et al. | 516/34 |
| 2008/0131571 A1* | 6/2008 | Nakayama et al. | 426/531 |

FOREIGN PATENT DOCUMENTS

| | | | |
|---|---|---|---|
| JP | H01-317115 | | 12/1989 |
| JP | H03-257010 | | 11/1991 |
| JP | H04-065314 | | 3/1992 |
| JP | H04-187512 | | 7/1992 |
| JP | H07-118008 | | 5/1995 |
| JP | H07-221059 | | 8/1995 |
| JP | H08-279480 | | 10/1996 |
| JP | H11-214338 | | 8/1999 |
| JP | 2001-011433 | * | 1/2001 |
| JP | 2001-048520 | | 2/2001 |
| JP | 2001-150334 | | 6/2001 |
| JP | 2002-003212 | | 1/2002 |
| JP | 2002-038049 | | 2/2002 |
| JP | 2003-133267 | | 5/2003 |
| JP | 2004-035293 | | 2/2004 |
| JP | 2004-288732 | | 10/2004 |
| JP | 2004-311652 | | 11/2004 |
| WO | WO0015552 | | 3/2000 |
| WO | WO 01/29145 | * | 4/2001 |

* cited by examiner

*Primary Examiner* — Melvin Mayes
*Assistant Examiner* — Yun Qian
(74) *Attorney, Agent, or Firm* — Manabu Kanesaka

(57) ABSTRACT

The present invention provides a sol of spinous silica-based particles in which silica-based particles having peculiar forms, spinous forms are dispersed in a solvent. The spinous silica-based particles have verrucous projections formed on surfaces of spherical silica-based particles. In the spinous particles, a value of the surface roughness ($SA1/SA2$, $SA1$ indicating a specific surface area measured by the BET method or the Sears method and $SA2$ indicating a specific surface area converted from an average particle diameter ($D2$) measured by the image analysis method) is in the range from 1.7 to 10. Furthermore the average diameter ($D2$) measured by the image analysis method is in the range from 7 to 150 nm.

15 Claims, 1 Drawing Sheet

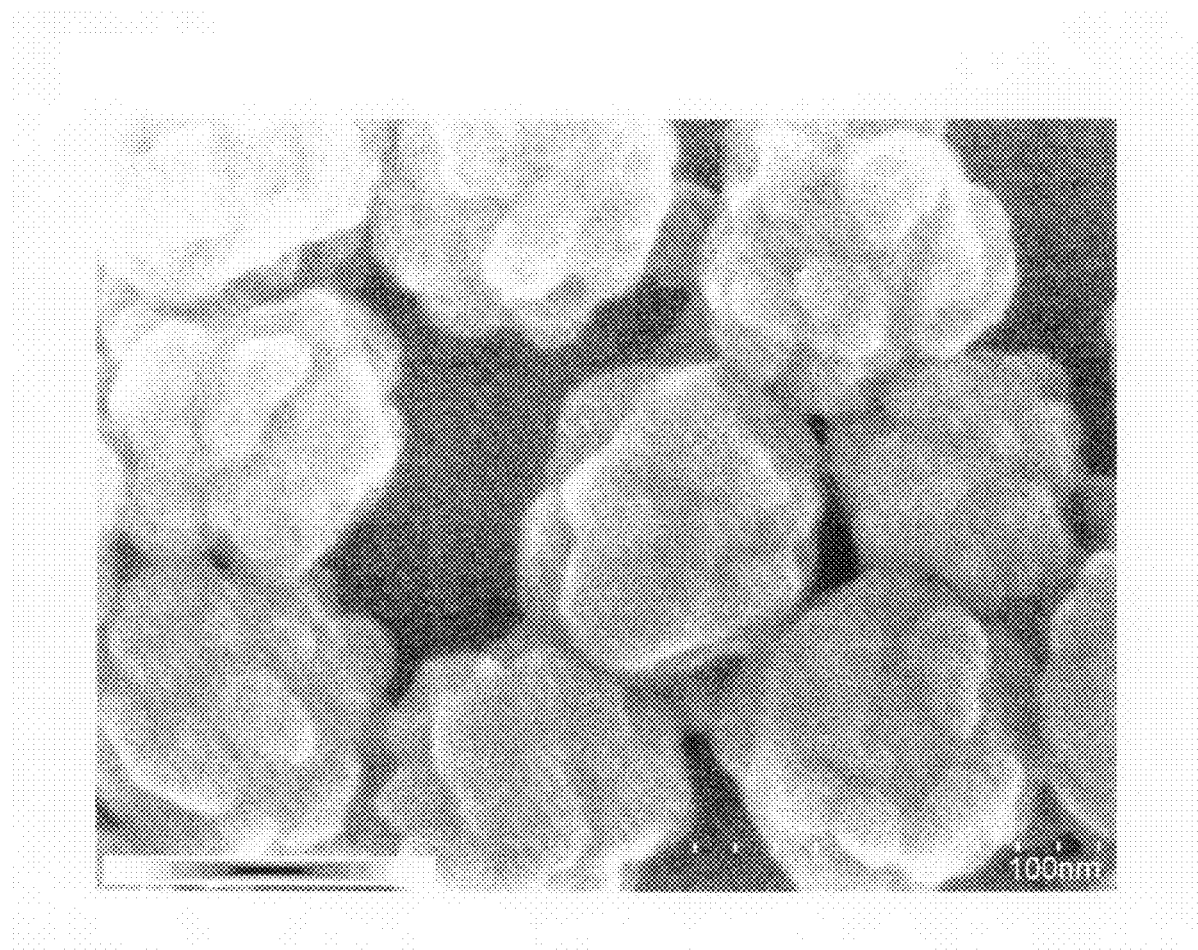

SPINOUS SILICA-BASED SOL AND METHOD OF PRODUCING THE SAME

TECHNICAL FIELD

The present invention relates to spinous silica-based particles each having verrucous projections on a surface of a core particle and dispersed in a solvent and to a method of producing the same. More particularly, this invention relates to a sol of spinous silica particles prepared by dispersing, in a solvent, spinous silica particles each having a plurality of verrucous projections on a surface of a core particle and a method of producing the same.

The present invention also relates to a spinous alumina-silica composite sol prepared by dispersing, in a solvent, spinous alumina-silica composite particles each having a plurality of verrucous projections on a surface of a core particles and a method of producing the same.

BACKGROUND TECHNOLOGY

As an example of silica sols preparing by dispersing silica particles in a solvent, there has been known a silica sol comprising silica particles having a non-spherical structure such as a chain structure, a beads chain structure or a prolate spheroidal structure, and are dispersed in a solvent. These silica sols are used, for example, as various abrasives.

JP H01-317115A (Patent document 1) discloses a method of producing a silica sol including heteromorphic particles of silica with the ratio $D_1/D_2$ of more than 5 wherein $D_1$ indicates a particle diameter measured by the image analysis method and is in the range from 40 to 500 millimicrons, and $D_2$ indicates a particle diameter measured by the nitrogen gas adsorption method. The silica sol produced by the method of the present invention includes amorphous colloidal silica particles extending in one plain with homogeneous diameter in the range of 5 to 40 millimicrons observed by an electron microscope to make elongate shape dispersed in liquid medium. The method comprises the steps of: (a) adding a predefined volume of an aqueous solution containing water-soluble calcium salt, magnesium salt or the like in a predefined colloidal aqueous solution of activated silicic acid and agitating the mixture solution; (b) adding an alkali metal oxide, a water-soluble organic base, or a water-soluble silicate of the compounds is added so as to make the mole ratio of $SiO_2/M_2O$ to be in the range of 20 to 200 (M indicates a molecule of the alkali metal oxide or the organic base); and (c) heating the mixture in the step at 60-150 degrees C. for 0.5-40 hours.

JP H04-65314A (Patent document 2) describes a method of producing a stable silica sol with the $SiO_2$ concentration of 50% by weight or below and the ratio $D_1/D_2$ in the range from 3 to 5 wherein $D_1$ indicates a particle diameter measured by the image analysis method and is in the range from 40 to 500 millimicrons, and $D_2$ indicates a particle diameter measured by the nitrogen gas adsorption method. In the method, when addition of an aqueous solution of the active silicic acid to a sol of slender silica particles, collapse of colloidal silica particles in the feed sol does not occur, and the added active silicic acid is deposited via the siloxane bond on a surface of the original slender particle to provide colloidal silica having a slender form with the diameter increased from the original one.

JP H04-187512A (Patent document 3) discloses a method of producing a sol, in which chain-like silica particles are dispersed in a solvent, with the $SiO_2/M_2O$ molar ratio in the range from 60 to 100. This method comprises the steps of adding a silicic acid solution into an aqueous solution of an alkali metal silicate with the $SiO_2$ content in the range from 0.05 to 5.0% by weight to prepare a mixture solution with the $SiO_2/M_2O$ ratio in the range from 30 to 60; adding a compound of one or more types of metals selected from the group consisting of Ca, Mg, Al, In, Ti, Zr, Sn, Si, Sb, Fe, Cu, and rare earth metals (before, during, or after addition of the silicic acid solution) to the mixture solution; maintaining the mixture solution at a temperature of 60 degrees C. or more for a prespecified period of time; and further adding a silicic acid solution into the mixture solution.

JP 3441142C (Patent document 4) proposes a polishing agent for semiconductor wafers comprising a stable silica sol in which a percentage of a silica particles having a major axis in the range from 7 to 1000 nm and a minor axis/major axis ratio in the range from 0.3 to 0.8 is 50% or more among all of the particles contained in the sol.

JP H07-118008A (Patent document 5) discloses a method of producing a sol of slender silica particles, and the method comprises the steps of adding an aqueous solution of a water-soluble potassium salt, a water-soluble magnesium salt, or a mixture thereof into a colloidal solution of active silicic acid; adding an alkaline substance into the obtained aqueous solution; heating a portion of the obtained mixture material up to 60 degrees C. or more to prepare a heel liquid (with the remaining portion defined as a feed liquid herein); adding the heel liquid to the feed liquid to evaporate water during the adding operation for obtaining a condensed liquid with the $SiO_2$ concentration in the range from 6 to 30% by weight.

JP H08-279480A (Patent document 6) discloses that, in the aqueous solution of colloidal silica prepared by, for instance, (1) a method in which an aqueous solution of alkali silicate is neutralized with a mineral acid, an alkaline substance is added in the neutralized solution, and the mixture solution is heated for aging; (2) a method in which an alkaline substance is added in active silicic acid obtained by subjecting an aqueous solution of alkali silicate to positive ion exchange, and the mixture solution is heated for aging; (3) a method in which active silicic acid obtained by hydrolyzing alkoxy silane such as ethyl silicate is heated for aging; and (4) a method in which silica particles are directly dispersed in an aqueous medium, colloidal silica generally having the diameter in the range from 4 to 1,000 nanometers and preferably having the diameter in the range from 7 to 500 nanometers are dispersed in an aqueous medium, and that the colloidal silica aqueous solution has the concentration in the range from 0.5 to 50% by weight and preferably in the range from 0.5 to 30% by weight calculated as that of $SiO_2$. The document also describes that forms of the silica particles include a spherical form, irregular form, a flat form, a plate-like form, a slender form, a fibrous form, and the like.

JP H11-214338A (Patent document 7) discloses a method of polishing a silicon wafer with a polishing agent containing colloidal silica particles as the main component, and the colloidal silica particles are obtained by methyl silicate refined by distillation is reacted to water in a methanol solvent in the presence of ammonia or in the presence of ammonia and ammonium salt as catalysts, and the major axis/minor axis ratio of the colloidal silica particle is 1.4 or more.

WO 00-15552A (Patent document 8) discloses a silica sol comprising spherical colloidal silica particles with the average diameter in the range from 10 to 80 nanometers and silica containing a metal oxide and bonding the spherical colloidal silica particles to each other, in which the ratio $D_1/D_2$ of the particle diameter ($D_1$) measured by the image analysis method versus the average diameter of the spherical colloidal silica particles ($D_2$: measured by the nitrogen adsorption method) is 3 or more, $D_1$ is in the range from 50 to 500 nanometers, and the spherical colloidal silica particles are coupled to each other on one plain to form beads-like colloidal silica particles.

Patent document 8 also describes a method of producing the silica sol, and the method comprises the steps of (a) adding an aqueous solution of water-soluble metal salt to a predefined amount of a colloid aqueous solution of active silicic acid or an acidic silica sol so that a content of a metal oxide in the mixture solution against $SiO_2$ in the colloid aqueous solution or in the acidic silica sol is in the range from 1 to 10% by weight to prepare a mixture solution 1; (b) adding an acidic sol of spherical silica particles with the average diameter in the range from 10 to 80 nanometers and with the pH in the range from 2 to 6 to the mixture solution 1 so that the weight ratio A/B (A indicating a content of silica originated from the acidic sol of spherical silica particles and B indicating a content of silica originated from the mixture solution 1) is in the range from 5 to 100, and at the same time so that a total content (A+B) of silica in a mixture solution 2 obtained by mixing the acidic sol of spherical silica particles with the mixture solution 1 is in the range from 5 to 50% by weight of $SiO_2$ in the mixture solution 2; and (c) adding, a hydroxide of alkali metal, a water-soluble organic base or a water-soluble silicate salt the obtained mixture solution 2 so that the pH is in the range from 7 to 11, and heating the resultant mixture solution.

JP 2001-11433A (Patent document 9) describes a method of producing a sol of beads-like silica particles, and the method comprises the steps of an aqueous solution containing a water-soluble salt of bivalent or trivalent metal singly or in combination with salt(s) of other metal(s) in a colloid aqueous solution of active silicic acid containing $SiO_2$ by 0.5 to 10% by weight and also having pH of 2 to 6 so that a content of the metal oxide (calculated as that of MO in a case of a salt of a bivalent metal, and of $M_2O_3$ in a case of a trivalent metal, and M indicating a bivalent or trivalent metal atom, and O indicating an oxygen atom) against $SiO_2$ in the colloid aqueous solution of the active silicic acid and agitating the obtained mixture solution to obtain a mixture solution (1); adding an acidic sol of spherical silica particles with the average diameter in the range from 10 to 120 nm and also having the pH of 2 to 6 in the obtained mixture solution (1) so that a ratio A/B (weight ratio) of a content of silica originated from the acidic sol of spherical silica particles (A) and a content of silica originated from the mixture solution (1) (B) is in the range from 5 to 100, and at the same time so that a total content of silica (A+B) in a mixture solution (2) obtained by adding the acidic sol of spherical silica with the mixture solution (1) is in the range from 5 to 40% by weight calculated as that of $SiO_2$ in the mixture solution (2) and agitating the resultant mixture solution; adding a hydroxide of alkali metal or the like in the mixture solution (2) so that the pH is in the range from 7 to 11 to obtain a mixture solution (3); and heating the obtained mixture solution (3) at a temperature in the range from 100 to 200 degrees C. for 0.5 to 50 hours to obtain a sol of beads-like silica.

JP 2001-48520A (Patent document 10) discloses a method of producing a silica sol in which amorphous silica particles with the average diameter in the range from 5 to 100 nanometers when observed with an electron microscope in the diametrical direction and the length in the range from 1.5 to 50 times of the diameter and also having a slender form are dispersed in a liquid-like dispersing medium. The method comprises the steps of hydrolyzing alkyl silicate with an acid catalyst without using a solvent in a composition with the silica concentration of 1 to 8 mole/litter, the acid concentration of 0.0018 to 0.18 mole/litter, and the water concentration of 0.2 to 1.5 mole/litters; then diluting the hydrolyte with water so that the silica concentration is in the range from 0.2 to 1.5 mole/litter; adding an alkaline catalyst so that the pH is 7 or more; and heating the solution to proceed polymerization of the silicic acid.

JP 2001-150334A (Patent document 11) discloses a method of producing a sol of silica particles each having a distorted form, and the method comprises the steps of adding an alkali-earth metal such as salts of Ca, Mg, and Ba to an acidic aqueous solution of active silicic acid with the $SiO_2$ concentration of 2 to 6% by weight obtained by subjecting an aqueous solution of an alkali metal silicate such as water glass to the processing for removing positive ions at a weight ratio of 100 to 1500 ppm against $SiO_2$ contained in the active silicic acid calculated as that of the oxide; furthermore adding the alkaline substance to the solution obtained in the step above so that the $SiO_2/M_2O$ ratio (M denoting an alkali metal atom, $NH_4$ or a quaternary ammonium group) is in the range from 20 to 150 to obtain an original heel liquid; repeating the same step to obtain, as a charge liquid, an aqueous solution of active silicic acid having the $SiO_2/M_2O$ molar ratio (M denoting an alkali metal atom, $NH_4$ or a quaternary ammonium group) in the range from 20 to 150 calculated based on the $SiO_2$ concentration with the concentration of 2 to 6% by weight; and evaporating and removing water from the solution at a rate of 0.05 to 1.0 calculated as the weight ratio of $SiO_2$ in the charge liquid/$SiO_2$ in the original heel liquid per hour (this final step may optionally be eliminated).

JP 2003-133267A (Patent document 12) describes that the particles for polishing containing groups of particles having irregular forms in which two or more primary particles having the average diameter in the range from 5 to 300 nanometers are coupled to each other, especially particles for polishing in which a percentage of the primary particles constituting the groups of irregularly-formed particles against the total number of primary particles in the particles for polishing is in the range from 5 to 100% are effective as particles for polishing capable of being applied to polishing a surface of a substrate for flattening without causing dishing (excessive abrasion).

JP 2004-288732A (Patent document 13) discloses a slurry for polishing a semiconductor substrate containing non-spherical colloidal silica, an oxidizing agent, and an organic acid, and water in which a major axis/minor axis ratio of the non-spherical colloidal silica is in the range from 1.2 to 5.0, while also JP 2004-311652A (Patent document 14) discloses similar non-spherical colloidal silica.

JP 2002-3212A (Patent document 15) discloses a method of producing a sol of chained silica particles coated with silica-alumina. The method comprises the steps of (a) adding a silicic acid solution to an aqueous solution of an alkali metal salt with the Si contents of 0.05 to 5.0% by weight calculated as that of $SiO_2$ to obtain a mixture solution with the $SiO_2/M_2O$ mole ratio of 30 to 60 (M denoting an alkali metal or quaternary ammonium); (b) adding one or more metal compounds of bivalent to quadrivalent metals prior to, during, or after the step of adding the silicic acid solution; (c) leaving the resultant mixture solution at a temperature of 60 degrees C. or more for a prespecified period of time; (d) again adding the silicic acid solution to the reaction liquid to adjust the $SiO_2/M_2O$ mole ratio to a range from 60 to 200; and (e) furthermore simultaneously adding an aqueous solution of an alkali silicate and an aqueous solution of an alkali aluminate to the reaction liquid keeping pH of the liquid in the alkaline region.

JP H03-257010A (Patent document 16) describes an example of silica-based particles each having projections on a surface thereof, and the silica particles have, on a surface thereof, successive irregular projections each having the size in the range from 0.2 to 5 µm when observed with an electron microscope, the average diameter in the range from 5 to 100 µm, the specific surface area of 20 m²/g or below when measured by the BET method, and the pore volume of 0.1 mL/g or below.

JP 2002-38049A (Patent document 17) describes silica-based particles each having a substantially spherical and/or semi-spherical projections on an entire surface of the core particle in which the projections are bonded to the core particles by chemical bond, and also describes silica-based particles each having a substantially spherical and/or semi-spherical projections on an entire surface of the core particle in which the projections are chemically bonded to the core particles. Furthermore, the document describes a method of producing silica-based particles, and the method comprises the steps of (A) generating polyorgano-siloxane by hydrolyzing a specific alkoxysilane compound and condensating the hydrolyte, (b) subjecting the polyorgano-siloxane particles to the surface processing with a surface absorbent; and (c) forming projections on the entire surface of the polyorgano-siloxane particle having been subjected to the surface processing in step (b) above with the alkoxysilane compound.

JP 2004-35293A (Patent document 18) discloses silica-based particles each having substantially spherical or semi-spherical particles on the entire surface of a maternal particle thereof. The silica-based particle is characterized in that the projections are chemically bonded to the maternal particles, and a compressive elasticity modulus of the material particle when compressed by 10% is different from that of the projection.

However, the articles described in JP H03-257010A (Patent document 16) are mainly those having the average diameter in the range from 5 to 10 µm, and the silica-based particles disclosed in JP 2002-38049A (Patent document 17) are only those with the average diameter substantially in the range from 0.5 to 30 µm, and what is described above is also applicable to JP 2004-35293A (Patent document 18).

[Patent document 1] JP H01-317115A
[Patent document 2] JP H04-65314A
[Patent document 3] JP H04-187512A
[Patent document 4] JP 3441142C
[Patent document 5] JP H07-118008A
[Patent document 6] JP H08-279480A
[Patent document 7] JP H11-214338A
[Patent document 8] WO 00-15552A
[Patent document 9] JP 2001-11433A
[Patent document 10] JP 2001-48520A
[Patent document 11] JP 2001-150334A
[Patent document 12] JP 2003-133267A
[Patent document 13] JP 2004-288732A
[Patent document 14] JP 2004-311652A
[Patent document 15] JP 2002-3212A
[Patent document 16] JP H03-257010A
[Patent document 17] JP 2002-38049A
[Patent document 18] JP 2004-35293A

DISCLOSURE OF THE INVENTION

The present invention provides a sol of spinous silica-based particles prepared by dispersing in a solvent silica particles each having a peculiar form, namely a spinous form, and also provides a production method enabling efficient production of the sol of spinous silica-based particles. More specifically, the present invention provides a sol of spinous silica particles in which silica particles each having a peculiar form, namely a spinous form are dispersed in a solvent, and a production method enabling efficient production of the sol of spinous silica particles as described above.

Furthermore, the present invention provides a sol of spinous alumina-silica composite particles in which alumina-silica composite particles each having a peculiar form, namely a spinous form are dispersed in a solvent, and also provided a production method enabling efficient production of a sol of the alumina-silica composite particles each a spinous form as described above.

The spinous silica-based sol according to the present invention contains spherical particles having a plurality of verrucous projections on a surface thereof with the surface roughness value ((SA1)/(SA2)) in the range from 1.7 to 10 wherein SA1 indicates a specific surface area measured by the BET method or the Sears method and SA2 indicates a specific surface area converted from the average particle diameter (D2) measured by the image analysis method and also with the average particle diameter (D2) measured by the image analysis method in the range from 7 to 150 nm, and the particles are dispersed in a solvent.

The spinous silica-based particles preferably comprise silica or alumina-silica composite.

The sphericity of the spinous silica-based particles is preferably in the range from 0.8 to 1.

The coefficient of variation (CV value) of diameters of the spinous silica-based particles is preferably in the range from 10 to 50%.

The sol of spinous silica particles according to the present invention contains spinous silica particles having a plurality of verrucous projections formed on a surface thereof with the surface roughness value (SA1)/(SA2) in a range from 1.7 to 10 wherein (SA1) indicates a specific surface area measured by the BET method or the Sears method and (SA2) indicates a specific surface area converted from the average particle diameter (D2) measured with the image analysis method and also with the average particle diameter (D2) in the range from 7 to 150 nm, and the silica particles are dispersed in a solvent.

The coefficient of variation (CV value) of diameters of the spinous silica particles is preferably in the range from 10 to 50%.

The sol of spinous alumina-silica composite particles according to the present invention contains composite particles having a plurality of verrucous projections comprising alumina and silica and formed on a surface of spherical silica particles with the surface roughness value ((SA1)/(SA2)) in the range from 1.7 to 10 wherein SA1 indicates a specific surface area measured by the BET method or the Sears method and SA2 indicates a specific surface area converted from the average particle diameter (D2) measured by the image analysis method and also with the average particle diameter (D2) measured by the image analysis method in the range from 7 to 150 nm, and the alumina-silica composition particles are dispersed in a solvent.

The coefficient of variation (CV value) of diameters of the spinous alumina-silica composite particles is preferably in the range from 10 to 50%.

The method of producing a sol of spinous silica particles according to the present invention comprises the step of adding, when core particles are grown by adding a solution B (an aqueous solution of alkali silicate) to a solution A (a dispersion of core particles or an aqueous solution of alkaline silicate) in the presence of an electrolyte comprising a salt of strong acid, 50 to 2500 weight portions of the solution B (as calculated as a weight of silica) to 100 weight portions of the solution A (as calculated as that of silica contained therein) so that the ratio $E_A/E_B$ ($E_A$ indicating an equivalent number of an alkali in the solution B and $E_E$ indicating an equivalent number of the electrolyte) is in the range from 0.4 to 8.

It is preferable to add the solution B and the electrolyte to the solution A over 15 minutes to 10 hours at a temperature in the range from 40 to 150 degrees C. for aging to generate and grow fine particles on surfaces of the core particles.

The method of producing a sol of spinous alumina-silica composite particles according to the present invention comprises the steps of:

continuously or intermittently adding sodium aluminate to a silica sol prepared by dispersing in a water-based solvent silica particles with the average diameter (D1) in a range from 3 to 150 nm converted from a specific surface area (SA1) measured by the BET method or the Sears method at a mixing rate of 0.1 to 2.5 weight portions of the sodium aluminate against 100 weight portions of the silica particles;

aging the mixture solution to prepare a dispersion liquid of alumina-coated silica particles;

adding 0.1 to 100 weight portions of alkali metal silicate to 100 weight portions of the alumina-coated silica particles;

aging the mixture solution; and continuously or intermittently adding a silicic acid solution to the mixture solution to grow the particles.

It is preferable to continuously or intermittently add 3 to 700 weight portions of the silicic acid solution calculated as that of silica to 100 weight portions of the alumina-coated silica particles over 2 to 24 hours.

The method of producing a sol of spinous silica-based particles according to the present invention comprises the step of:

continuously or intermittently adding a) 10 to 10000 weight portions of alkali metal borate (converted from to that of $B_2O_3$) and b) 100 to 20000 weight portions (converted from to that of silica) of a silicic acid solution or an alkali metal silicate 100 to 20000 weight portions of an alkali metal silicate in a silica sol prepared by dispersing in a water-based solvent silica particles with an average diameter (D1) in a range from 3 to 150 nm converted from a specific surface area (SA1) measured by the BET method or the Sears method against 100 weight portions of the silica particles; and cleaning the mixture solution with pure water or subjecting the mixture solution to ion exchange according to the necessity.

A polishing agent according to the present invention comprises any of the sols of spinous silica-based particles described above.

A composition for polishing according to the present invention comprises any of the sols of spinous silica-based particles described above.

As a representative example of the sol of spinous silica-based particles according to the present invention, there can be enlisted a sol of spinous silica particles or a sol of spinous alumina-silica composite particles.

The sol of spinous silica particles according to the present invention contains silica particles each having a peculiar form dispersed therein, and can effectively be used as a polishing agent and a composition for polishing.

The sol of spinous alumina-silica composite particles according to the present invention contains alumina-silica composite particles each having a peculiar form dispersed therein, and can effectively be used as a polishing agent and a composite for polishing.

The spinous silica-based particles according to the present invention have different infilling property, oil-adsorption property, electric characteristics, optical characteristics, and physical properties from the ordinary spherical silica particles because of the specific structure.

The present invention provides methods of producing a sol of spinous silica-based particles. The methods are largely classified to three types, so that a suited production method can be selected according to an object, an application, or raw materials.

With the production method according to the present invention, in which, for instance, an electrolyte as a raw material according to the present invention, it is possible to efficiently obtain a sol of spinous silica particles in which the spinous silica particles are dispersed in a solvent. Especially, by adjusting an average diameter of the spinous silica particles as a raw material, an amount of an electrolyte used, and conditions for growing particles, it becomes possible to control forms (surface roughness) of generated spinous silica particles.

With the production method according to the present invention in which, for instance, sodium aluminate is used as a raw material, it is possible to efficiently obtain a sol of a spinous alumina-silica composite particles in which the spinous alumina-silica composite particles are dispersed in a solvent. Especially, by adjusting an average diameter of the silica particles, an amount of sodium aluminate used, and conditions for growing the particles, it becomes possible to control a form (surface roughness) of the generated spinous alumina-silica composite particles.

With the production method according to the present invention in which, for instance, an alkali metal borate is used as a raw material, it is possible to efficiently obtain a sol of spinous silica particles in which the spinous silica particles are dispersed in a solvent. Especially, by adjusting an average diameter of spinous silica particles used as a raw material, an amount of the alkali metal borate used, and conditions for growing the particles, it becomes possible to control a form (surface roughness) of the generated spinous silica particles.

BRIEF DESCRIPTION OF THE DRAWINGS

[FIG. 1] A picture of the sol of alumina-silica particles obtained in Example 21 and taken with a scan electron microscope (with the resolution of 250,000 times)

BEST MODE FOR CARRYING OUT THE INVENTION

A sol of spinous silica-based particles according to the present invention is prepared by dispersing spinous silica-based particles in a solvent. A composition constituting the spinous silica-based particles is, for instance, silica or silica-alumina. Sodium compounds, potassium compounds, alumina compounds or boron compounds each used as a portion of the raw material may reside in the compositions.

The spinous silica-based sol according to the present invention contains spherical particles having a plurality of verrucous projections on a surface thereof with the surface roughness value ((SA1)/(SA2)) in the range from 1.7 to 10 wherein SA1 indicates a specific surface area measured by the BET method or the Sears method and SA2 indicates a specific surface area converted from the average particle diameter (D2) measured by the image analysis method and also with the average particle diameter (D2) measured by the image analysis method in the range from 7 to 150 nm, and the particles are dispersed in a solvent.

The surface roughness value ((SA1)/(SA2)) is preferably in the range from 1.7 to 8, the average diameter (D2) is preferably in the range from 10 to 130 nm.

The sphericity of the spinous silica-based particles is preferably in the range from 0.8 to 1. The coefficient of variation (CV value) of diameters of the spinous silica-based particles is preferably in the range from 10 to 50%.

In the spinous alumina-silica composite particles according to the present invention, a ratio of D3/HP (wherein D3 indicates an average inner diameter of the spherical particle of each alumina-silica composite particles measured by the image analysis method and HP indicates an average height of the verrucous projections measured by the image analysis method) is preferably in the range from 100/5 to 100/50.

Description is made for a sol of spinous silica particles which is a typical example of the sols of spinous silica-based particles according to the present invention.

[A Sol of Spinous Silica Particles]

The silica particles constituting the sol of silica particles according to the present invention have verrucous projections each formed on a spherical particles respectively, and the form is substantially spinous. A range of the surface having a plurality of verrucous projections as described above is defined according to the surface roughness.

In the present invention, the surface roughness is defined by the ratio of SA1/SA2, wherein SA1 indicates a specific surface area (a surface area per unit weight) measured by the BET method or the Sears method and SA2 indicates a specific surface area converted from the average particle diameter (D2) measured by the image analysis method.

The specific surface area (SA1) measured by the Sears method is obtained from a consumption rate of a hydroxide solution when the sodium hydroxide solution is dripped to a silica sol, and it may be said that this value reflects an actual surface area. The BET method is used for calculating a specific surface area from an amount of gas (generally nitrogen gas) absorbed into particles, and it may be said that also this value reflects the actual surface area.

The specific surface area (SA2) converted from the average diameter (D2) of the particles measured by the image analysis method is calculated through the following expression (1) based on the assumption that 50 particles selected at random on a projected picture obtained by photographing a sample silica sol with a transmission electron microscope are measured for the maximum diameter (DL) of each particle to obtain the average particle diameter (D2) and also that silica particles dispersed in the sample silica sol are typical spherical particles:

$$SA2=6000/(D2 \times \rho) \qquad (2)$$

wherein ρ indicates a density of sample particles, and the density is 2.2 in the case of silica.

The specific surface area indicates a surface area per unit weight, and the more verrucous projections are on a surface of a particles, a value of the surface roughness (SA1/SA2) becomes larger, while the less the verrucous projections are on the particle surface, the value of (SA/1/SA2) becomes smaller and approximates to 1.

In the present invention, the surface roughness of the spinous silica particles is in the range from 1.7 to 10. When the surface roughness is less than 1.7, the number of projections is small, or a size of the verrucous projection itself is too smaller as compared to that of a diameter of the spinous silica particles, and a form of the particles approximates to that of a spherical silica particles. When the value of surface roughness is over 10, synthesis of the particles is not easy. It is preferable that the surface roughness is in the range from 1.7 to 8.

The spinous silica particles according to the present invention are required to be spherical, and do not include those having peculiar forms such as rod-like, a comma-like, slender, or egg-like forms. The spinous silica particles according to the present invention are spherical ones, and are differentiated from peculiar silica particles.

The expression of spherical particles as used herein means those with the sphericity in the range from 0.8 to 1.0. The term of "sphericity" as used herein means an average value of ratios of DS/DL (DL indicating a maximum diameter and DS indicating a shorter diameter perpendicular to the maximum diameter) for 50 particles selected at random from a projection pictorial drawing obtained by photographing with a transmission electron microscope. When the sphericity is less than 0.8, the silica particles are not defined as spherical ones, and may fall in the category of particles having peculiar forms.

The spinous silica particles according to the present invention have the average diameter (D2) in the range from 7 to 150 nm when measured by the image analysis method.

When a sol of spinous silica particles is produced by the method according to the present invention as described below, if the average diameter (D2) is over 150 nanometers, generally the built-up process proceeds excessively and the projections are apt to become flatter, although the tendency depends on size of the core particles as the raw material. When the average diameter (D2) is less than 7 nanometers, it is not easy to prepare silica particles having necessary surface roughness. The average diameter (D2) is preferably in the range from 10 to 100 nm.

The solvent in which the silica particles are dispersed may be any of water, an organic solvent, or a mixture of water and an organic solvent.

A coefficient of variation (CV value) of diameters of the spinous silica particles according to the present invention is preferably in the range from 10 to 50%. The spinous silica particles as described above have generally high homogeneity in the particles, and therefore, when used as a polishing agent, the particles show excellent polishing property (a polishing rate).

The coefficient of variation (CV value) is defined by the following expression (2):

$$CV\,\text{value}=(\sigma/Dn) \times 100 \qquad (2)$$

(wherein σ: Standard deviation in particle diameters and Dn: Average particle diameter).

When the coefficient of variation (CV value) is less than 10%, homogeneity in the particle diameters is extremely high. In this case, however, a period of time required for production increases, and the production cost increases, and also the polishing rate becomes lower. When the coefficient of variation (CV value) is over 50%, the surface precision after polishing process becomes lower. The coefficient of variation (CV value) of the diameters is more preferably in the range from 15 to 35%.

The coefficient of variation (CV value) described above is also application of other spinous silica-based particles according to the present invention, namely to the spinous alumina-silica composite particles.

[Method of Producing a Sol of Spinous Silica Particles]

The method of producing a sol of spinous silica particles according to the present invention includes a step of adding an aqueous solution of alkali silicate (this aqueous solution is referred to as "solution B" in the following description) to a dispersion liquid of core particles or an aqueous solution of alkali silicate (the dispersion liquid of core particles or the aqueous solution of alkali silicate is referred to as "solution A" in the following description) in the presence of an electrolyte comprising a salt of strong acid for growing particles. In this step, the solution B is added to the solution A at the rate of 50 to 2500 weight portions of silica in the solution B to 100 weight portions of silica in the solution A so that the ratio $E_A/E_E$ is the range from 0.4 to 8 (wherein $E_A$ indicates an equivalent number of the alkali in the solution B and $E_E$ indicates an equivalent number of the electrolyte).

The method of producing a sol of spinous silica particles according to the present invention is described in detail below.

Dispersion Liquid of Core Particles or Aqueous Solution of Alkali Silicate (Solution A)

Any known silica sol may be used as a dispersion liquid of core particles which is the solution A. As the silica sol, advantageously it is possible to use the silica sol obtained by the method disclosed in JP S63-64911A filed by the present applicant, or a dispersion liquid of silica particles having a relatively small diameter which is used as seed particles used in the method described above.

There is not any specific restriction over diameters of silica particles in the core particle dispersion liquid so long as spherical silica particles with the average diameter (D2) in the range from 7 to 150 nanometers when measured by the image analysis method can be obtained by applying the method of producing a sol of spinous silica particles according to the present invention. Generally a core particle dispersion liquid, in which silica particles with the average diameter of 140 nanometers or below when measured by the image analysis method are dispersed, is used for this purpose.

When diameters of the core particles are over 140 nanometers, sometimes it is impossible to obtain a sol of spinous silica particles even if the production method according to the present invention is applied. A lower limit of the average particle is preferably that of an oligomer, preferably a silicic acid polymer comprising 10 or more monomers thereof. As the silica particles in the core particle dispersion liquid, non-porous ones are preferable than porous ones for production of spinous silica particles according to the present invention.

A concentration of the core particle dispersion liquid calculated as that of silica is preferably in the range from 0.005 to 10% by weight, and more preferably in the range from 0.01 to 5% by weight, although the preferred concentration varies according to diameters of the core particles. When the silica concentration of the core particle dispersion liquid is less than 0.005% by weight, the number of core particles is too small, and it is required to make smaller a supply rate of the aqueous solution of alkali silicate (solution B) and/or an electrolyte. When the supply rate is not made smaller, new fine particles are generated and functions as the core particles, so that distribution of diameters of particles in the obtained sol may become broad, which is inefficient for preparation of a sole of spinous silica particles. When the concentration of the core particles dispersion liquid is over 10% by weight, the concentration is too high, and when the aqueous solution of alkali silicate and/or the electrolyte is supplied, the particles may aggregate. In this case, the distribution of particles diameters become board, and there is the tendency that particles attached to each other are generated, which is not preferable for preparation of a sol of spinous silica particles.

pH of the core particle dispersion liquid is preferably in the range from 8 to 12, and more preferably in the range from 9.5 to 11.5. When the pH is less than 8, reactivity of the core particles is low, and a speed at which the supplied aqueous solution of alkali silicate is slow, and as a result, a quantity of alkali silicate may increase, or new particle are generated. In this case, the generated new particles function as core particles, and distribution of particle diameters in the obtained sol may become broad, or aggregated particles may be obtained, which is not preferable for efficient production of spinous silica sol. When the pH is over 12, solubility of silica becomes higher, so that precipitation of silica becomes slower, which is apt to delay growth of particles.

pH of the core particle dispersion liquid can be adjusted by adding an alkali substance. More specifically, it is possible to use, for this purpose, an alkali metal hydroxide such as NaOH, KOH, and the like, or ammonia water, quaternary ammonium hydroxide, amine compounds, and the like. There is no specific restriction over a temperature for preparing the core particle dispersion liquid, and the temperature is generally in 10 to 30 degrees C.

As the solution A according to the present invention, it is possible to an aqueous solution of alkali silicate such as sodium silicate or potassium silicate. A sol of spinous silica particles can be obtained also by adding an aqueous solution of alkali silicate, which is the solution B, to the aqueous solution of alkali silicate in the presence of an electrolyte. This effect is obtained, because fine particles are generated and grow in the aqueous solution of alkali silicate, which is the solution A, in the initial state in the process of adding the aqueous solution of alkali silicate which is the solution B and the fine particles function as core particles later.

Aqueous Solution of Alkali Silicate (Solution B)

In the present invention, silica particles are grown by adding an electrolyte and an aqueous solution of alkali silicate (solution B) to the solution A. It is allowable to previously add either a portion or all of the electrolyte in the solution A, but it is also allowable to add the electrolyte together with the aqueous solution of alkali silicate, which is the solution B, continuously or intermittently respectively.

The alkali silicates used for preparing the solution B include alkali silicates such as LiOH, NaOH, KOH, RbOH, CsOH, $NH_4OH$, quaternary ammonium hydride. Of these compounds, sodium silicate (water glass), potassium silicate, and the like can advantageously be used. Furthermore it is also advantageous to use an aqueous solution of alkali silicate obtained by hydrolyzing a hydrolyzable organic compound such as tetraethyl orthosilicate (TEOS) using an excessive quantity of NaOH or the like.

A temperature of a dispersion liquid in which the aqueous solution of alkali silicate as the solution B is accessed is preferably in the range from 40 to 150 degrees C., and more preferably in the range from 60 to 100 degrees C. When the temperature is less than 40 degrees C., the reaction rate of the silicate is small, and sometimes a quantity of silicate not reacting increases, or particles with desired particles can not be obtained. When the temperature of the dispersion liquid is over 150 degrees C., the operating pressure becomes too high, which leads to increase in the device cost and lowering of the production capability with the economical efficiency spoiled. In addition, the effect of raising the reaction rate and particle growth speed is actually low.

A quantity of the aqueous solution of alkali silicate as the solution B (when calculated as that of silica) is preferably in the range from 50 to 2500 weight portions against 100 weight portions of silica contained in the solution A, although the quantity varies according to the temperature and the reaction time employed in the process of growing particles. When the quantity is less than 50 weight portions, the particle growth speed itself is low, and it is not easy to efficiently obtain a sol of spinous silica particles having the required surface roughness. When the quantity is over 2500 weight portions, growth of the core particles proceeds excessively, and generally the silica particles are apt to have flat surfaces respectively. A more preferable quantity of the solution B added in the solution A (as calculated as that of silica) is in the range from 80 to 1800 weight portions.

Electrolyte

A known water-soluble salt comprising an acid and a base may be used as an electrolyte in the present invention. Especially, an electrolyte comprising a salt of a strong acid can accept alkali in the alkali silicate, and preferably produce a silicate used for growth of the core particles in the present invention. As the water-soluble electrode comprising a salt of a strong acid as described above, there can be enlisted, for instance, sodium salts, potassium salts, lithium salts, rubidium salts, cesium salts, ammonium salts, calcium salts, or magnesium salts of strong acids such as a sulfuric acid, a nitric acid, a hydrochloric acid. Furthermore, also alums such as potassium alum, and ammonium alum, which are composite salts of sulfuric acid, are preferable.

The quantity of the electrolyte is preferably adjusted so that the ratio $E_A/E_E$ ($E_A$ indicating an equivalent number of alkali in the solution B and $E_E$ indicating an equivalent number of the electrolyte) is in the range from 0.4 to 8, and more preferably in the range from 0.4 to 5. When the ratio $E_A/E_E$ is less than 0.4, a concentration of the electrolyte salt in the dispersion liquid is too high, which may disadvantageously cause aggregation of particles. When the ratio $E_A/E_E$ is over 8, the particle growth speed is insufficient because an amount of the electrolyte is small, and therefore there is no difference from the conventional technology in which particles are grown by supplying an acidic silicic acid solution. Furthermore, the electrolyte accepts alkali in the alkali silicate, which reduces a quantity of generated silicate which can be used for growth of core particles, and sometimes it may be impossible to obtain particles each having a required diameter.

A concentration of the electrolyte in the dispersion liquid is preferably in the range from 0.05 to 10% by weight. More preferably the concentration is in the range from 0.1 to 5% by weight. A portion or all of the electrolyte may be added discretely from the aqueous solution of alkali silicate (solution B), or may be added together with the aqueous solution of alkali silicate (solution B) continuously or intermittently respectively. In this step, preferably the quantity of the electrolyte has the relation with the quantity of alkali silicate as described above.

The solution B added in the solution A is preferably adjusted by diluting the solution B with water or condensing the solution B according to the necessity so that the concentration of $SiO_2$ in the aqueous solution of alkali silicate is in the range from 0.5 to 10% by weight, and more preferably in the range from 1 to 7% by weight. When the concentration of $SiO_2$ is less than 0.5% by weight, the concentration is too low and the production efficiency is low, and sometimes condensation is required when the solution B is used as a product. On the other hand, when the concentration of $SiO_2$ is more than 10% by weight, the silica particles are apt to aggregate, which sometimes makes it impossible to obtain a sol in which silica particles each with homogeneous diameter are uniformly dispersed. Also in the case where an electrolyte or an electrolyte and water are added to the solution B and then the solution B is added to the solution A, the concentration of $SiO_2$ is preferably in the range as described above.

Furthermore, while core particles are grown by adding the solution B to the solution A, pH of the dispersion liquid may be maintained in the range from 8 to 13 and more preferably in the range from 10 to 12 by adding an alkali or an acid, if required. As the alkali to be added in this step, there can be enlisted, for instance, sodium hydroxide, potassium hydroxide, lithium hydroxide, ammonia water, and amines such as triethylamine or triethanolamine. As the acid to be added in this step, there can be enlisted, for instance, hydrochloric acid, nitric acid, sulfuric acid, and such an organic acid as acetic acid.

Aging and Deionization

After the solution B is added, the mixture solution is aged according to the necessity. The temperature for aging is in the range from 40 to 150 degrees C., and more preferably in the range from 60 to 100 degrees C. The time required for aging is generally in the range from 30 minutes to about 5 hours, although the time varies according to the temperature employed for aging. By performing the aging as described above, it is possible to obtain a sol of silica particles having more homogeneous diameters and excellent in the stability.

Furthermore, and if required, ions in the dispersion liquid may be removed after the temperature of the dispersion liquid is lowered to about 40 degrees C. or below. Any known method may be employed for removing ions in the dispersion liquid, and the methods which can be employed in this step includes, for instance, the ultrafiltration film method, the ion exchange resin method, and the ion exchange membrane method.

The obtained silica sol is condensed according to the necessity. For condensing the silica sol, generally the ultrafiltration method, the evaporation method, or a combination of the methods may be employed, and a concentration of the silica sol after the condensation is generally in the range from 10 to 50% by weight as converted to that of $SiO_2$. The silica sol is further condensed according to the necessity when used actually.

Organosol

The sol of spinous silica particles according to the present invention is can be used for producing an organosol by substitution with an organic solvent. Any known method may be employed for the substitution, and when a boiling point of the organic solvent is higher than that of water, the required organic sol can be obtained by adding an organic solvent and then performing distillation. When the boiling point of the organic solvent is low, the required sol can be obtained by using, for instance, the ultrafiltration method disclosed in JP S59-8614A applied by the present applicant. A concentration of the obtained organosol is in the range from 10 to 50% by weight as converted to that of $SiO_2$. When actually used, the organosol may be diluted or furthermore condensed according to the necessity.

When it is necessary to obtain a sol of spinous silica particles with the coefficient of variation of diameters in the range from 10 to 50%, it is preferable to use a dispersion liquid of core particles in which distribution of the particle diameters is monodisperse, and more preferably it is recommended to use a dispersion liquid of core particles with the coefficient of variance of less than 50%. When growing core particles for a dispersion liquid as described above, it is desirable to employ the production method described above. The method of preparing the silica sol, in which the distribution of particle diameters is monodisperse, is disclosed for instance, in JP S63-45113A or JP 2003-26417A.

Description is made for a sol of spinous silica particles which is an another typical example of the sols of spinous alumina-silica composite particles according to the present invention.

[A Sol of Spinous Alumina-Silica Composite Particles]

The sol of spinous alumina-silica composite particles according to the present invention contains composite particles each having a plurality of verrucous projections comprising alumina and silica and formed on a surface of a spherical silica particle dispersed in a solvent, and in the spinous alumina-silica composite particles, a value of surface roughness SA1/SA2 (SA1 indicating a specific surface area measured by the BET method or the Sears method, while SA2 indicating a specific surface area converted from the average particle diameter (D2) measured by the image analysis method) is in the range from 1.7 to 10, and the average particle diameter (D2) measured by the image analysis method is in the range from 7 to 150.

The spinous alumina-silica composite particle is a spherical one having a plurality of verrucous projections on a surface thereof, and the structure is generally spinous. A range of the surface having a plurality of verrucous projections as described above is defined by the surface roughness.

In the present invention, the surface roughness is defined by the value of SA1/SA2, wherein SA1 indicates a specific surface area measured by the BET method or the Sears method, while SA2 indicates a specific surface area converted from the average particle diameter (D2) measured by the image analysis method.

The specific surface area (SA1) measured by the BET method is generally used for detecting a quantity of nitrogen by equilibrium-absorbing nitrogen at the temperature of liquid nitrogen into particles to be measures and then raising the temperature to desorb the absorbed nitrogen by raising the temperature, and it may be said that the value reflects an actual surface area of the sample particle. It is also allowable to use the specific surface area measured not by the nitrogen adsorption method, but by the sodium dripping method as the value SA1.

The specific surface area (SA2) converted from the average particle diameter (D2) measured by the image analysis method is calculated through the following expression (1):

$$SA2 = 6000/(D2 \times \rho) \quad (1)$$

wherein D2 indicates an average particle diameter obtained by averaging maximum diameters (DL) 50 particles selected at random on a picture of a sample silica sol with a transmission electron microscope, and based on the assumption that silica particles dispersed in the sample silica sol are ideal spherical ones.

In the expression (1), $\rho$ indicates a density of the sample particles, and the value is 2.2 in the case of silica, and in the range from 3.3 to 4.0 in the case of alumina. Although the particles according to the present invention are composite particles comprising silica and alumina, but because a weight ratio of silica is substantially larger as compared to that of alumina, only the silica density may be used as a density of the sample.

Because the expression is based on the assumption described above, it may be said that the value of the specific surface area (SA2) expresses a specific surface area of spherical silica particles having smooth surfaces corresponding to the average particle diameter (D2).

The term of specific surface area as used herein indicates a surface area per unit weight, and therefore a value of the surface roughness (SA1)/(SA2) becomes larger when the particles are spherical and there are more projections on surfaces of the particles, while the value of (SA1)/(SA2) becomes smaller and approximates to 1 when the number of verrucous projections on the surfaces becomes smaller and the surfaces are more smooth.

In the present invention, the surface roughness of the spinous alumina-silica composite particles is in the range from 1.7 to 10. When the surface roughness is less than 1.7, a percentage of verrucous projections is too small, or the verrucous projections themselves are too small as compared to diameters of the alumina-silica particles, and in this case the particles are substantially spherical ones. When the surface roughness is over 10, the synthesis is not easy. The surface roughness of the spinous alumina-silica composite particles is preferably in the range from 1.7 to 5.0.

In the spinous alumina-silica composite particles according to the present invention, a ratio of D3/HP (wherein D3 indicates an average inner diameter of the spherical particle of each alumina-silica composite particles measured by the image analysis method and HP indicates an average height of the verrucous projections measured by the image analysis method) is preferably in the range from 100/5 to 100/50.

When the ratio (D3/HP) is less than 100/5, surfaces of the particles are extremely close to the smooth state, and, for instance, in the polishing effect, the difference in the effect can hardly be recognized. When the ratio (D3/HP) is over 100/50, synthesis of the particles is not easy. The ratio (D3/HP) is more preferably in the range from 100/7 to 100/30.

Minimum diameters of 50 particles selected at random from a picture obtained by photographing a sample silica sol with the resolution of 250,000 times are measured with a scan electron microscope, and an average value of the minimum diameters is calculated to obtain an average inner diameter (D3) of spherical particle portions of the spinous alumina-silica composite particles.

In addition, in each of 50 spinous alumina-silica composite particles selected at random, a distance from a vertex of an verrucous projection selected at random to a contact point with the spherical particle is measured at three points, and an average value of all the measurement values is calculated, and the value is used as an average height (HP) of the verrucous projections.

The spinous alumina-silica composite particles described above are generally required to be spherical ones, and do not include those having peculiar forms such as rod-like, a comma-like, slender, or egg-like forms. In the present invention, the spinous alumina-silica composite particles are spherical, and are differentiated from alumina-silica particles having peculiar forms.

The expression of "spherical" as used herein means that the sphericity is in the range from 0.8 to 1.0. The term of "sphericity" as used herein means an average value of ratios of DS/DL (DL indicating a maximum diameter and DS indicating a shorter diameter perpendicular to the maximum diameter) for 50 particles selected at random from a projection pictorial drawing obtained by photographing with a transmission electron microscope. When the sphericity is less than 0.8, the silica particles are not defined as spherical ones, and may fall in the category of particles having peculiar forms.

An average particle diameter (D2) of the spinous alumina-silica composite particles measured by the image analysis method is in the range from 7 to 150 nm.

When a sol of the spinous alumina-silica composite particles is prepared by the production method according to the present invention described below, if the average particle diameter (D2) is over 150 nm, generally the built-up process proceeds excessively and the projections are apt to become flatter, although the tendency depends on size of the core particles as the raw material. When the average diameter (D2) is less than 7 nm, it is not easy to prepare silica particles having necessary surface roughness. It is recommended that the average diameter of the spinous alumina-silica composite particles is preferable in the range from 10 to 130 nm, and more preferably in the range from 10 to 80 nm.

As the solvent in which the spinous alumina-silica composite particles are dispersed, any of water, an organic solvent, or a mixture of the materials may be used.

[Method of Producing a Sol of Spinous Alumina-Silica Composite Particles]

Silica Sol as a Raw Material

There is no specific restriction over a method of producing silica particles used as core particles for preparing the sol of spinous alumina-silica composite particles according to the present invention, and silica particles procurable from the market or any known silica particles may be used.

For instance, the following methods may be employed for producing the silica sol as described above:

1) a silica sol production method comprising the step of polymerizing a silicic acid by heating a silicic acid solution obtained by dealkalizing a water-soluble silicate selected from an alkali metal silicate, a tertiary ammonium silicate, a quaternary ammonium silicate, or guanidine silicate in the presence of an alkali;

2) a silica sol production method comprising the steps of cleaning the silica hydrogel obtained by neutralizing a silicate with an acid for removing salts, adding an alkali, and heating the silica hydrogel for defluocculation; and 3) a silica sol production method comprising the steps of hydrolyzing a silicon compound containing a hydrolyzable group for polymerization of the obtained silicic acid.

A structure of silica particles in the silica sol as the raw material is spherical. As far as a size of silica sol as the raw material is less than that of spinous silica-based particles according to the present invention, the size of silica sol as raw material is not necessary restricted. For instance, the average particle diameter (D1) converted from the specific surface area measured by the BET method or the Sears method is in the range from 3 to 150 nm (which corresponds to the case where the average particle diameter (D2) obtained by the image analysis method is in the range from 3 to 140 nm), and the silica particles are dispersed in a solvent.

When a sol of silica particles with the average diameter (D1) of less than 3 nm, it is impossible to confirm generation of the spinous alumina-silica composite particles. When a sol of silica particles with the average diameter (D1) of more than 150 nm, an extremely long period of time is required for growing the particles after coated with alumina, which cause problems in actual use. Preferably silica particles in the silica sol as a raw material are not porous one, but are non-porous ones, because the non-porous silica particles are suited to stable production of spinous silica-based particles.

pH of the silica sol as a raw material is preferably in the range from 8 to 12. When the pH is less than 2, the acidity is too high, which spoils stability of the silica sol, and in this case it is not easy to produce the spinous alumina-silica composite particles. On the other hand, with the pH is over 12, the solubility is too high, which is not suited to growth of particles. The pH is preferably in the range from 8.5 to 10.5.

A concentration of solid phase $SiO_2$ in the silica sol as a raw material is generally in the range from 1 to 50% by weight. When the concentration is less than 1% by weight, the silica sol can not be produced efficiently. On the other hand, when the concentration is over 50% by weight, stability of the silica sol becomes lower, and aggregation of the particles easily occurs, so that the concentration of over 50% by weight is not desirable.

As the silica sol as a raw material, it is preferable to use a silica sol in which silica particles are dispersed in an aqueous solvent. The silica sol based on an aqueous solvent is an alkaline oxide, which is suited to coating with sodium aluminate.

In the present invention, it is desirable to dilute the silica sol as a raw material with pure water according to the necessity for adjusting a concentration of solid phase silica to 2 to 40%.

Sodium Aluminate

In the production method according to the present invention, an aqueous solution of sodium aluminate ($NaAlO_2$) is added to the silica sol as a raw material to prepare alumina-coated silica particles, in each of which alumina blocks are present in the patchy state on a surface of the silica particle.

A concentration of the sodium aluminate (solid phase) is in the range from 0.1 to 2.5 weight portions, and more preferably in the range from 0.1 to 2.0 weight portions against 100 weight portions of the silica particles contained in the silica sol as a raw material. A quantity of used sodium aluminate is in the range as described above, a surface of the silica particle is not completely coated with alumina, and is generally coated with alumina in the patchy state. It is guessed that the surface of the alumina-coated silica particle has the chemical structure as expressed by the following formula (2):

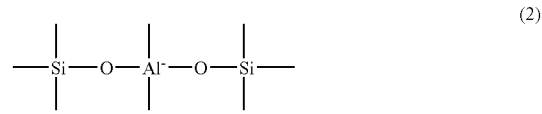

(2)

In this structure, an area around an Al atom is more water-soluble as compared to an area around a Si atom, and functions as a starting point for growth of a particle in the subsequent process, and therefore a plurality of verrucous projections are formed on a surface of the silica particles. It is considered that the spinous alumina-silica composite particles according to the present invention are formed through the production process as described above.

A temperature when the aqueous solution of sodium aluminate is added is preferably in the range from 10 to 30 degrees C., and more preferably in the range from 10 to 28 degrees C.

When the temperature is over 30 degrees C., core generation of sodium aluminate occurs, and silica-alumina coating is hardly formed in the subsequent aging step. When the temperature is less than 10 degrees C., sodium aluminate does not react to a surface of the silica particle actively, and therefore patchy coating with alumina is hardly formed.

It is necessary to add an aqueous solution of sodium aluminate over 10 minutes to 10 hours continuously or intermittently. When the aqueous solution of sodium aluminate is added continuously, it is desirable to add the aqueous solution of sodium aluminate at a constant rate or at a substantially constant rate within a prespecified period of time. Also when the aqueous solution of sodium aluminate is added intermittently, it is desirable to add the aqueous solution of sodium aluminate at a constant rate or at a substantially constant rate.

When all or most of the required quantity of aqueous solution of sodium aluminate is added all at once, sometimes alumina coating may be performed on a surface of each silica particle nonuniformly, and it becomes difficult to form patchy coating, and as a result it becomes difficult to obtain the desired spinous alumina-silica composite particles.

When the aqueous solution of sodium aluminate is added to a silica sol as a raw material, generally the silica sol is sufficiently agitated during the adding operation.

It is necessary to perform aging for 1 to 7 hours at the temperature in the range from 60 to 98 degrees C. for forming nonuniform layer of silica-alumina on the surface of each particle. When aging is performed at the temperature of less than 60 degrees C., time is required for converting the surface to the silica-alumina layer, which is not advantageous from the economical point of view. Aging at the temperature of 98 degrees C. is not necessary. When the time for aging is less than 1 hour, the silica-alumina layer is not formed sufficiently, and desired spinous particles are not obtained. Aging for more than 7 hours is not necessary.

Process for Growing Particles

Alkali metal silicate is added to the obtained alumina-coated silica sol for seeding, and further aged, and the silicic acid solution is added for growth of particles, and is further aged to prepare a sol of spinous alumina-silica composite particles in which the spinous alumina-silica composite particles are dispersed in a solvent. The process for growing the particles is described below.

Alkali Metal Silicate

In the production method according to the present invention, an alkali metal silicate is added to a sol of alumina-coated silica particles obtained in the preceding step. Because the alkali metal silicate is added, a concentration of $SiO_2$ dissolved in the solvent is previously set to a high level when the silicic acid solution is added for growth of particles, and therefore a silicic acid is deposited fast on the alumina-coated silica particles as the core particles.

The alkali metal silicates which may be used in this step include, for instance, sodium silicate (water glass), potassium silicate, and lithium silicate, and triethanolamine silicate is used as a tertiary ammonium silicate, while tetra-methanol ammonium silicate or tetra-ethanol ammonium silicate is used as a quaternary ammonium silicate. Generally these alkali metal silicates are used as an aqueous solution.

Addition of an alkali metal silicate to a sol of the alumina-coated silica particles is generally performed at a temperature in the range from the room temperature to 99 degrees C., and is preferably performed at the room temperature.

A quantity of an alkali metal silicate to a sol of alumina-coated silica particles is preferably adjusted so that a concentration of solid phase silica after addition of the alkali metal silicate is in the range from 1 to 10% by weight.

Seeding

After the alkali metal silicate is added to the sol of alumina-coated silica particles, the sol is aged for 10 minutes to 1 hour at the temperature of 75 to 99 degrees C.

Silicic Acid Solution

The silicic acid solution used in the present invention is prepared by dealkalizing a water-soluble silicate, and generally is an aqueous solution of a lower polymerized silicic acid obtained by dealkalizing an aqueous solution of a silicate with a cation-exchange resin. Generally the silicic acid solution with the pH in the range from 2 to 4 and the $SiO_2$ concentration of 10% by weight and preferably in the range from 2 to 7% by weight is used as a raw material, because gelation seldom occurs at the room temperature and the solution is relatively stable.

An addition rate of the silicic acid solution varies according to an average diameter or a concentration of core particles in the dispersion liquid, and it is desirable to add the silicic acid solution at a rate at which generation of fine particles except core particles does not occur. The silicic acid solution may be added once or several times until alumina-silica composite particles having a desired average diameter are obtained.

The silicic acid solution is added continuously or intermittently over 2 to 24 hours at the temperature in the range from 70 to 99 degrees C. When the temperature for addition is less than 70 degrees C., an extremely long period of time may be required for growing particles, or growth of particles itself may not proceed. When the temperature is over 99 degrees C., the dispersion liquid boils and then growth of particles is inhibited. It is not desirable to add the silicic acid solution all at once, and it is desirable to add the silicic acid solution continuously or intermittently over the period of time described above.

After the silicic acid solution is added, the dispersion liquid may be aged for 0.5 to 5 hours at the temperature in the range from 70 to 99 degrees C. according to the necessity. When aging is performed as described above, a content of Na ions in the obtained alumina-silica composite particles may be further reduced, and the particle diameter distribution is apt to become more homogeneous. Furthermore, a dispersion liquid of the alumina-silica composite particles can be obtained by removing excessive ions, for instance, with a ultrafiltration film and condensing or diluting the filtrate according to the necessity. Furthermore, a dispersion liquid of the alumina-silica composite particles can be obtained by replacing the aqueous solvent with the organic solvent by means of the ultrafiltration film method or the distillation method.

[Method of Producing a Sol of Spinous Silica-Based Particles Using an Alkali Metal Borate]

In addition to the production method described above, a production method using an alkali metal borate can advantageously be used.

A silica sol with the average particle diameter in the range from 3 to 150 nm converted from a specific surface area (SA1) measured by the BET method or the Sears method and the silica concentration in the range from 0.1 to 5% by weight is kept at the temperature in the range from 60 to 100 degrees C., and then an aqueous solution of an alkali metal borate (with the concentration in the range from 0.5 to 5% by weight) and a silicic acid solution or an alkali metal silicate are added at the same time. The silicic acid solution used in this step is required to have the silica concentration in the range from 1 to 6% by weight. An aqueous solution of an alkali metal silicate with the silica concentration in the range from 1 to 40% by weight is used as the alkali metal silicate. Generally water glass is advantageously used.

The addition should not be performed all at once, and is preferably performed continuously or intermittently.

A quantity of the added aqueous solution of alkali metal borate is preferably in the range from 10 to 10000 weight portion (as converted from that of $B_2O_3$), and a use rate of the silicic acid solution or the alkali metal silicate is preferably in the range from 100 to 20000 weight portions (as converted to that of silica).

When a quantity of the added alkali metal borate (as converted to that of $B_2O_3$) is less than 10 weight portions, sometimes a quantity of the borate becomes relatively too small, and in this case, it becomes difficult to generate spinous particles. On the other hand, when a quantity of the added alkali metal borate (as converted to that of $B_2O_3$) is more than 10000 weight portions, sometimes a quantity of the borate becomes relatively too excess, it becomes difficult to generate spinous particles.

When the quantity of added silicic acid solution or alkali metal silicate is less than 100 weight portions (as converted to that of silica), spinous particles are hardly formed in the subsequent step even if the alkali metal borate is removed. On the other hand, when a quantity of the added silicic acid solution or alkali metal silicate is more than 20000 weight portions, it becomes difficult to generate spinous particles.

After the alkali metal borate and the silicic acid solution or the alkali metal silicate is added, the pH is preferably in the range from 9 to 12. In addition, cleaning with pure water or ion exchange is performed, if required. Generally the concentration of silica is condensed to 10 to 15% by weight, for instance, by a ultrafiltration film. The silica concentration may be condensed to 15 to 45%, for instance, by using a rotary evaporator.

As the alkali metal borate, there can be enlisted, for instance, sodium tetraborate, sodium pentaborate, sodium hexaborate, sodium octaborate, sodium diborate, potassium metaborate, potassium tetraborate, potassium pentaborate, potassium hexaborate, potassium octaborate, ammonium metaborate, ammonium tetraborate, ammonium pentaborate, ammonium octaborate, and the like.

[Polishing Agent and Composition for Polishing]

The sol of spinous silica-based particles according to the present invention can effectively be used as a polishing agent and a composition for polishing.

More specifically, the sol of spinous silica-based particles according to the present invention can be used for polishing agent as they are, and furthermore can be used together with other components (such as a polishing promoting agent or the like) for forming a composition for polishing.

The composition for polishing according to the present invention is prepared by dispersing the spinous silica-based particles for polishing described above in a dispersion medium. Although water is used as the dispersion medium, also such alcohols as methyl alcohol, ethyl alcohol, and iso-propyl alcohol may be used according to the necessity, and in addition such water-soluble organic solvents as ethers, esters, and ketones may be used.

A concentration of silica particles for polishing in the polishing material should preferably be in the range from 2 to 50 weight %, and more preferably in the range from 5 to 30 weight %. When the concentration is less than 2 weight %, the concentration is too low for some types of substrates and insulating films, and in that case the polishing rate is too low to provide high productivity. When the concentration of silica particles is over 50 weight %, stability of the polishing material is insufficient, so that the polishing rate or the polishing efficiency can not further be improved, and sometimes dried materials may be generated and deposited on the substrate during the process of feeding a dispersion liquid for the polishing process, which may in turn generate scratches.

Any of such known additives as hydrogen peroxide, per-acetic acid, urea peroxide, and a mixture thereof may be added to the polishing material according to the present invention, although the appropriate additive varies according to a type of a work to be polished. When such additive as hydrogen peroxide is used, the polishing rate can effectively be improved in the case of metallic work to be polished.

Further, such acids as sulfuric acid, nitric acid, phosphoric acid, and fluoric acid; sodium salts, potassium salts, and ammonium salts of these acids; and a mixture thereof may be added to the polishing material according to the present invention. When plural types of works are polished with these additives, by making higher or lower the polishing rate for a particular work comprising specific components, finally a planarized surface can be obtained by polishing.

As other additives, imidazole, benzotriazole, benzotiazole, or the like may be used to prevent corrosion of a substrate by forming an immobilized layer or a dissolution suppressing layer on a surface of the metallic work to be polished.

Further such organic acids as citric acid, lactic acid, acetic acid, oxalic acid, and phtalic acid, or a complex forming agent for these organic acids may be added to the polishing material to disturb the immobilized layer.

Cationic, anionic, nonionic, or amphoteric surfactant may be added to the polishing material for improving dispersibility or stability of a slurry of the polishing material.

Further, pH of the slurry of polishing material may be adjusted by adding an acid or a base according to the necessity to improve the effect of adding each of the additives as described above.

With the present invention, since the silica particles for polishing contain a prespecified content of carbon and also have elasticity, the polishing rate with the polishing material comprising the particles for polishing can easily be controlled without any scratch generated, and a surface of a substrate can be polished into the extremely planarized and smooth state. Further the silica particles substantially contain no Na content, so that Na is not deposited on a surface of a semiconductor substrate or an oxidized film, and therefore the silica particles for polishing according to the present invention are extremely useful in planarizing a substrate, especially in forming a metal wiring layer in a semiconductor integrated circuit.

EXAMPLES

Analysis Method Employed in Examples and Comparative Examples

Preferable examples of the present invention are described below. The specific surface area (SA2) calculated from the average particle diameter (D2) measured by the image analysis method, the specific surface area (SA1) measured by the BET method or the Sears method, and the sphericity (SA1/SA2) are measured or calculated by the analysis methods [1] to [4] respectively, and the result is as shown in Tables 1 to 3.

Furthermore in the examples and the comparative examples, a quantity of $Na_2O$, a quantity of Cl (chlorine), a quantity of $SO_4$, a quantity of $NO_3$, and polishing performance for an aluminum substrate are measured or accessed by the analysis methods [5] to [9] respectively, and the result is shown in Tables 1 to 3. The coefficient of variation (CV value) is measured by the method described in [10] below, and the result is shown in Tables 1 to 3.

In the examples 21 to 25 and the comparative examples 21 to 23, measurement of an average particle diameter of spherical particle portions constituting spinous alumina-silica composite particles by image analysis is measured by the analysis methods [11], and measurement for solid materials in a dispersion liquid of alumina-coated silica particles is measured by the analysis methods [12], and the result is shown in Table 2.

[1] Method of Measuring an Average Particle Diameter (D2) by Image Analysis and Method of Calculating a Specific Surface Area (SA2)

50 particles selected at random on a picture obtained by photographing a sample silica sol with the resolution of 250,000 times with a transmission electron microscope (produced by Hitachi Inc., H-800) are measured each for the maximum diameter (DL) to obtain the average value as an average particle diameter (D2). The specific surface area (SA2) is obtained by substituting the value of average particle diameter (D2) into the expression (1).

[2] Measurement of a Specific Surface Area and Measurement of an Average Particle Diameter by the Sears Method 1) A sample equivalent to 1.5 grams of $SiO_2$ is put in a beaker and is then removed to a constant temperature reaction bath (kept at 25 degrees C.), and then pure water is added to adjust a liquid volume to 90 ml (The following operations are performed in the constant temperature reaction bath kept at 25 degrees C.).

2) 0.1 mole/L hydrochloric acid aqueous solution is added to adjust the pH to 3.6.
3) 30 grams of sodium chloride is added and the solution is diluted with pure water, and the mixture solution is agitated for 10 minutes.
4) a pH electrode is set, and the pH is adjusted to 4.0 with agitation dripping the 0.1 mole/L sodium hydroxide aqueous solution.
5) The sample with the pH adjusted to 4.0 is tittered with the 0.1 mole/L sodium hydroxide solution. A titer and a pH value are recorded at four or more points, and an analytical curve is prepared by plotting a titer of the 0.1 mole/L sodium hydroxide solution as X and the pH value as Y.
6) A consumption rate V (ml) of the 0.1 mole/L sodium hydroxide solution required, for 1.5 grams of $SiO_2$ until pH is adjusted to 4.0 to 9.0, is calculated through the following expression (2), and then a specific surface area SA ($m^2/g$) is calculated through the expression (3) below.

The average particle diameter D1 (nm) is calculated through the expression (4).

$$V=(A \times f \times 100 \times 1.5)/(W \times C) \quad (2)$$

$$SA=29.0V-28 \quad (3)$$

$$D1=6000/(\rho \times SA) \quad (4)$$

(wherein $\rho$ indicates a density of the particles ($g/cm^3$). 2.2 is substituted to $\rho$ for silica.)

Meanings of the signs in expression (2) are as described below respectively.

A: Titer (ml) of the 0.1 mole/L sodium hydroxide solution required for 1.5 grams of $SiO_2$ until the pH is adjusted to the range from 4.0 to 9.0;

f: value of the force of the 0.1 mole/L sodium hydroxide solution;

C: $SiO_2$ concentration in a sample (%)

W: weight of sample (g)

[3] Measurement of Specific Surface Area by the BET Method (Nitrogen Adsorption Method)

pH of 50 ml of silica sol is adjusted with $HNO_3$ to 3.5 with 40 ml of 1-propanole added therein, and is dried for 16 hours at 110 degrees C. to obtain the sample. The sample is pulverized in a mortar, and the pulverized sample is sintered for 1 hour in a muffle furnace at the temperature of 500 degrees C. to obtain a sample for measurement. Then the specific surface area is calculated by the BET 1 point method from an adsorption rate of nitrogen by using the nitrogen adsorption method (BET method) with a specific surface area measuring instrument (produced by Yuasa Ionix Corp., Type number: multisorb 12).

More specifically, 0.5 grams of the sample is put in a measurement cell, and the sample is subjected to a degassing process for 20 minutes at the temperature of 300 degrees C. in a mixture gas flow of nitrogen by 30% by volume and helium by 70% by volume. Then the sample is kept in the mixed gas flow at the liquid nitrogen temperature so that nitrogen is equilibrium-adsorbed. Then, the sample temperature is gradually raised to the room temperature flowing the mixed gas, and a quantity of nitrogen desorbed during the operation is detected. Then a specific surface area of the silica particles in the sol is calculated based on a detection curve previously prepared. The average particle diameter (D1) is obtained by substituting the obtained specific surface area (SA) into the expression (4).

[4] Method of Measuring Sphericity 50 particles are selected at random on a picture obtained by photographing a sample silica sol with the resolution of 250,000 times using a transmission electron microscope (produced by Hitachi Inc., H-800), and a ratio DS/DL is measures for each of the particles (wherein DL indicates a maximum diameter of each particle and DS indicates a shorter diameter perpendicular to the maximum diameter). An average of the ratios is obtained as the sphericity.

[5] Method of Quantifying $Na_2O$

A quantity of $Na_2O$ is measured as described below.

1) About 10 grams of a sample silica sol is put in a platinum plate, and the weight is measured up to the level of 0.1 mg.

2) 5 ml of nitric acid and 20 ml of hydrofluoric acid are added to the sample, and the mixture is heated on a sand bath for evaporating, drying, and solidifying the sample.

3) When a quantity of the liquid becomes small, 20 ml of hydrofluoric acid is further added to the sample and the mixture is heated on the sand bath for evaporating, drying, and solidifying the sample.

4) After the sample is cooled to the room temperature, 2 ml of nitric acid and about 50 ml of water are added to the sample, and the mixture is heated and melted on a sand bath.

5) When the mixture is cooled down to the room temperature, the sample is put in a flask (100 ml) and is diluted with 100 ml of water to obtain a sample liquid.

6) A content of each metal presenting the sample liquid is measured with an atomic adsorption spectro photometer (produced by Hitachi Inc., Z-300, measurement mode: atomic adsorption, wavelength for measurement: 190 to 900 nm, and wavelength for detection of Na in the silica sample: 589.0 nm). Measurement with an atomic adsorption spectro photometer is performed by converting a sample flame to atomic vapor, irradiating light with a suited wavelength to the atomic vapor layer, and measuring intensity of the light absorbed by the atoms to define an element density in the sample.

7) 2 ml of 50% aqueous solution of sulfuric acid is added to 10 grams of the sample silica sol, and is evaporated, dried, and solidified on a platinum plate. The obtained solid material is sintered for one hour at the temperature of 1000 degrees C., and then is cooled and weighed. Then the weighed solid material is dissolved in a small quantity of 50% aqueous solution of sulfuric acid. Furthermore 20 ml of hydrofluoric acid is added to the sample, and the mixture is evaporated, dried, and solidified on the platinum plate, and the dried material is sintered for 15 minutes at the temperature of 1000 degrees C., and is then cooled and weighed. A difference between the weights above is measured to obtain the silica content.

8) A ratio of Na against $SiO_2$ is calculated from the results in the steps 6) and 7) above, and the difference is converted to a content of $Na_2O$.

[6] Method of Quantifying Cl (Chlorine)

A quantity of Cl is measured as described below.

1) About 20 grams of the sample silica sol is put in a 200 ml beaker, and is weighed to the level of 0.1 mg.

2) 100 ml of acetone, 5 ml of acetic acid, and 4 ml of 0.002 mol/l aqueous solution of sodium chloride are added to the sample to obtain a sample liquid.

3) A titer for an alcohol solution of silver nitrate (with the silver nitrate concentration of 0.002 mol/l) against the sample solution is measured with an automatic potentiometric titration device (produced by Kyoto Electronic Industry Corp., AT-610, detection range: −2000 to 2000 mV, pH: 0 to 14, temperature: 0 to 100 degrees C.). Furthermore a blank experiment solution is prepared like as described in 2) above excluding the point that the sample silica sol is not added, and a titer for the black experiment solution is measured. Then, a content of chloride in the sample is obtained through the following expression (6).

$$Cl\ [ppm]=((A-B)\times f\times C)/W \quad (6)$$

A: Titer of the silver nitrate alcohol solution (ml) against the sample solution
B: Titer of the silver nitrate alcohol solution (ml) against the black experiment solution
f: Value of the force of the silver nitrate alcohol solution
C: Cl titer in 1 ml of silver nitrate alcohol solution=71 (μg)
W: Weight of the sample (g)

[7] Method of Quantifying Sulfate Ions ($SO_4^{2-}$)

A quantity of sulfate ions is measured with an ion chromatography (produced by DIONEX, 2010i). The target ions are separated in an ion exchange column, and the electric conductivity is continuously detected and analyzed.

[8] Method of Quantifying Nitrate Ions ($NO_3^-$)

A quantity of nitrate ions is measured by ion chromatography like in the case of measurement of sulfate ions.

[9] Method of Accessing Polishing Performance for an Aluminum Substrate

Preparation of Slurry for Polishing $H_2O_2$, HEDP (1-hydroxy ethylidene-1,1-disulufonic acid) and ultrapure water are added to each sol of spinous silica particles with the silica concentration of 20% by weight obtained in each of the examples and comparative examples to prepare a slurry for polishing containing silica by 9% by weight, $H_2O_2$ by 0.5% by weight, and HEDP by 0.5% by weight, and then $HNO_3$ is added according to the necessity to prepare a slurry for polishing with pH of 2.

Polished Substrate

A substrate for an aluminum disk is used as a substrate to be polished. This substrate for an aluminum disk is a substrate (95 mmφ/25 mmφ–1.27 mmt) having been subjected to non-electrolytic plating with Ni—P having the thickness of 10 μm (to form a solid Ni—P plating layer containing Ni by 88% by weight and P by 12% by weight). This substrate is previously subjected to primary polishing, and the surface roughness (Ra) is 0.17 nm.

Polishing Test

A substrate to be polished is set on a polishing device (produced by Nano Factor Corp., NF300). A polishing pad ("Apolon" produced by Rhordel Corp.) is used, and the polishing test is carried out by feeding a polishing slurry at the rate of 20 grams/minute for 5 minutes under the conditions including the substrate load of 0.05 MPa and the table rotating speed of 30 rpm.

A change in a weight of the polished substrate before and after polishing is measured to obtain the polishing rate.

A polishing rate for a sol of spinous silica particles in each of Examples 1 to 6, and 12 to 17 is decided based on the assumption that the polishing rate by the silica sol in Comparative Example 2 is 1. An average particle diameter in Comparative Example 2 substantially corresponds to the average diameter (D2) of spinous silica particles forming a sol and measured by the image analysis method in each of the examples.

Likely, a polishing rate for a sol of spinous silica particles in each of Examples 7 to 9 is decided based on the assumption that the polishing rate by the silica sol in Comparative Example 4 is 1.

A polishing rate in Examples 10 and 11 is decided based on the assumption that the polishing rate by the silica sol in Comparative Example 3 is 1.

A polishing rate in Comparative Example 1 is decided based on the assumption that the polishing rate by the silica sol in Comparative Example 5 is 1.

[10] Measurement of a Coefficient of Variation (CV Value) in Particle Diameters

A dispersion liquid of silica particles is diluted with 0.58% ammonia water to adjust the pH to 11 and the silica concentration to 0.01% by weight, and the average particle diameter and the coefficient of variation (CV value) are measured with the following particle size distribution measuring instrument.

(Particle Size Distribution Measuring Instrument)
Product type: NICOP 380
Producer: Particle Sizing Systems Co. Ltd.
Principle in measurement: Dynamic light scattering method (homodyne/particle size distribution)
Light source: 5 mW He—Ne Laser (standard)
Detector: Electron multiplier tube for photo-counting
Correlator: 32-bit Digital Auto-Correlator (with a DSP packaged therein)
Measurement cell: Tetrahedoron transmission cell (disposable)
Temperature control system: Peltier Device (computer-controlled)
Rate of set-up temperature: 5 to 80 degrees C.
Range of particle size to be measured: 1 nm to 5 μm
Target for measurement: Colloidal particles

[11] Measurement of an Average Particle Diameter of Spherical Particle Portions Constituting Spinous Alumina-Silica Composite Particles by Image Analysis 50 particles are selected at random on a picture obtained by photographing silica particles in a sample sol with a scan electron microscope (produced by Hitachi Inc.: H-800) at the resolution of 250,000 times, and a minimum inner diameter of a spherical particle portions forming each of the spinous alumina-silica composite particles is measured to obtain the average value (D3).

Furthermore, in each of 50 spinous alumina-silica composite particles selected at random, distance from a vertex of a verrucous projects selected at random to a contact point between the verrucous projection and the peripheral particle portions is measured at three points respectively, and an average value of all the measured values is calculated to obtain an average height of the verrucous projections.

[12] Measurement for Solid Materials in a Dispersion Liquid of Alumina-Coated Silica Particles 2 grams of a sample (a dispersion liquid of alumina-coated silica particles) is put in a skull cubicle furnace, and is evaporated, dried, and solidified. The obtained solid material is calcinated at 1000 degrees C. for 1 hour, put in a desiccator, cooled therein, and weighed. A content of the alumina-coated silica particle is obtained from a difference in the weight before and after the process described above.

Example 1

Preparation of Core Particle Dispersion Liquid

Water is added to 102.4 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 4170 grams, and then an aqueous solution of sodium hydroxide with the concentration of 5% by weight is added so that the pH of the silica sol is adjusted to 11. Then a temperature of the silica sol is raised to 80 degrees C., and the solution is kept at 80 degrees C. for 30 minutes to obtain a core particle dispersion liquid (solution A).

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2352 grams of water is added to 98.0 grams of ammonium sulfate (produced by Mitsubishi Chemicals Co., Ltd.) as an electrolyte to prepare 2450 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 1.0. After aging is performed for one hour at 80 degrees C., the core particle dispersion liquid in which particles have been grown is cleaned with a ultrafiltration until the pH is adjusted to 10.8. Then the dispersion liquid is condensed to obtain a sol of spinous silica particles with the $SiO_2$ concentration of 20% by weight.

Example 2

Preparation of Core Particle Dispersion Liquid

Water is added to 102.4 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 4170 grams, and then an aqueous solution of sodium hydroxide with the concentration of 5% by weight is added so that the pH of the silica sol is adjusted to 11. Then a temperature of the silica sol is raised to 65 degrees C., and the solution is kept at 65 degrees C. for 30 minutes to obtain a core particle dispersion liquid (solution A).

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2352 grams of water is added to 98.0 grams of ammonium sulfate (produced by Mitsubishi Chemicals Co., Ltd.) as an electrolyte to prepare 2450 grams of an aqueous solution of the electrolyte. Then, the aqueous solution of alkali silicate (solution B) and the aqueous solution of electrolyte are added to all of the core particle dispersion liquid (solution A) kept at the temperature of 65 degrees C. over 1 hour at the temperature of 65 degrees C. respectively to growth particles.

The equivalent ratio $E_A/E_E$ between the alkali in the solution B and the electrolyte is 1.0. After aging is performed for one hour at 65 degrees C., the core particle dispersion liquid in which particles have been grown is cleaned with a ultrafiltration until the pH is adjusted to 10.1. Then the dispersion liquid is condensed to obtain a sol of spinous silica particles with the $SiO_2$ concentration of 20% by weight.

Example 3

Preparation of Core Particle Dispersion Liquid

Water is added to 102.4 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 4170 grams, and then an aqueous solution of sodium hydroxide with the concentration of 5% by weight is added so that the pH of the silica sol is adjusted to 11. Then a temperature of the silica sol is raised to 95 degrees C., and the solution is kept at 95 degrees C. for 30 minutes to obtain a core particle dispersion liquid (solution A).

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2376 grams of water is added to 74.2 grams of ammonium nitrate (produced by Mitsubishi Chemicals Co., Ltd.) as an electrolyte to prepare 2450.2 grams of an aqueous solution of the electrolyte. Then, the aqueous solution of alkali silicate (solution B) and the aqueous solution of electrolyte are added to all of the core particle dispersion liquid (solution A) kept at the temperature of 95 degrees C. over 1 hour at the temperature of 95 degrees C. respectively to growth particles.

The equivalent ratio $E_A/E_E$ between the alkali in the solution B and the electrolyte is 0.8. After aging is performed for one hour at 95 degrees C., the core particle dispersion liquid in which particles have been grown is cleaned with a ultrafiltration until the pH is adjusted to 10. Then the dispersion liquid is condensed to obtain a sol of spinous silica particles with the $SiO_2$ concentration of 20% by weight.

Example 4

Preparation of Core Particle Dispersion Liquid

Water is added to 102.4 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 4170 grams, and then an aqueous solution of sodium hydroxide with the concentration of 5% by weight is added so that the pH of the silica sol is adjusted to 11. Then a temperature of the silica sol is raised to 65 degrees C., and the solution is kept at 65 degrees C. for 30 minutes to obtain a core particle dispersion liquid (solution A).

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2376 grams of water is added to 74.2 grams of ammonium nitrate (produced by Mitsubishi Chemicals Co., Ltd.) as an electrolyte to prepare 2450.2 grams of an aqueous solution of the electrolyte. Then, the aqueous solution of alkali silicate (solution B) and the aqueous solution of electrolyte are added to all of the core particle dispersion liquid (solution A) kept at the temperature of 65 degrees C. over 1 hour at the temperature of 65 degrees C. respectively to growth particles.

The equivalent ratio $E_A/E_E$ between the alkali in the solution B and the electrolyte is 0.8. After aging is performed for one hour at 65 degrees C., the core particle dispersion liquid in which particles have been grown is cleaned with a ultrafiltration until the pH is adjusted to 10.2. Then the dispersion liquid is condensed to obtain a sol of spinous silica particles with the $SiO_2$ concentration of 20% by weight.

Example 5

Preparation of Core Particle Dispersion Liquid

Water is added to 102.4 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 4170 grams, and then an aqueous solution of sodium hydroxide with the concentration of 5% by weight is added so that the pH of the silica sol is adjusted to 11. Then a temperature of the silica sol is raised to 95 degrees C., and the solution is kept at 95 degrees C. for 30 minutes to obtain a core particle dispersion liquid (solution A).

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2410 grams of water is added to 39.7 grams of ammonium chloride (produced by Mitsubishi Chemicals Co., Ltd.) as an electrolyte to prepare 2449.7 grams of an aqueous solution of the electrolyte. Then, the aqueous solution of alkali silicate (solution B) and 5210 grams of the aqueous solution of electrolyte are added to all of the core particle dispersion liquid (solution A) kept at the temperature of 95 degrees C. over 1 hour at the temperature of 95 degrees C. respectively to growth particles.

The equivalent ratio $E_A/E_E$ between the alkali in the solution B and the electrolyte is 1.0. After aging is performed for one hour at 95 degrees C., the core particle dispersion liquid in which particles have been grown is cleaned with a ultrafiltration until the pH is adjusted to 10.1. Then the dispersion liquid is condensed to obtain a sol of spinous silica particles with the $SiO_2$ concentration of 20% by weight.

Example 6

Preparation of Core Particle Dispersion Liquid

Water is added to 102.4 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 4170 grams, and then an aqueous solution of sodium hydroxide with the concentration of 5% by weight is added so that the pH of the silica sol is adjusted to 11. Then a temperature of the silica sol is raised to 65 degrees C., and the solution is kept at 65 degrees C. for 30 minutes to obtain a core particle dispersion liquid (solution A).

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2410 grams of water is added to 39.7 grams of ammonium sulfate (produced by Mitsubishi Chemicals Co., Ltd.) as an electrolyte to prepare 2449.7 grams of an aqueous solution of the electrolyte. Then, the aqueous solution of alkali silicate (solution B) and 5210 grams of the aqueous solution of electrolyte are added to all of the core particle dispersion liquid (solution A) kept at the temperature of 65 degrees C. over 1 hour at the temperature of 65 degrees C. respectively to growth particles.

The equivalent ratio $E_A/E_E$ between the alkali and the electrolyte in the solution B is 1.0. After aging is performed for one hour at 65 degrees C., the core particle dispersion liquid in which particles have been grown is cleaned with a ultrafiltration until the pH is adjusted to 10.3. Then the dispersion liquid is condensed to obtain a sol of spinous silica particles with the $SiO_2$ concentration of 20% by weight.

Example 7

Preparation of Core Particle Dispersion Liquid

Water is added to 24.8 grams of silica sol (produced by Catalysts & Chemicals Industries Co. Ltd., Cataloid SI-40 with the average diameter (measured by the image analysis method) of 21.2 nm and the $SiO_2$ concentration of 40.7% by weight) to obtain a solution (with the $SiO_2$ concentration of 1% by weight) with the total weight of 1010 grams, and then an aqueous solution of sodium hydroxide with the concentration of 5% by weight is added so that the pH of the silica sol is adjusted to 11. Then a temperature of the silica sol is raised to 80 degrees C., and the solution is kept at 80 degrees C. for 30 minutes to obtain a core particle dispersion liquid (solution A).

Growth of Core Particles 708 grams of water glass (produced by AGC Si-Tech CO., Ltd: JIS NO.3 water glass with the $SiO_2$ concentration of 24% by weight) is diluted with 2692 grams of water to prepare 3400 grams of aqueous solution of alkali silicate (solution B). Furthermore, 2899 grams of water is added to 120.8 grams of ammonium sulfate (produced by Mitsubishi Chemicals Co., Ltd.) as an electrolyte to prepare 3019.8 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 5 hour at the temperature of 80 degrees C. respectively to growth particles.

The equivalent ratio $E_A/E_E$ between the alkali in the solution B and the electrolyte is 1.0. After aging is performed for one hour at 80 degrees C., the core particle dispersion liquid in which particles have been grown is cleaned with a ultrafiltration until the pH is adjusted to 9.4. Then the dispersion liquid is condensed to obtain a sol of spinous silica particles with the $SiO_2$ concentration of 20% by weight.

Example 8

Preparation of Core Particles Dispersion Liquid

The core particles dispersion liquid (solution A) is prepared like in Example 7.

Growth of Core Particles 708 grams of water glass (produced by AGC Si-Tech CO., Ltd: JIS NO.3 water glass with the $SiO_2$ concentration of 24% by weight) is diluted with 2692 grams of water to prepare 3400 grams of aqueous solution of alkali silicate (solution B). Furthermore, 2928 grams of water is added to 91.4 grams of ammonium nitrate (produced by Mitsubishi Chemicals Co., Ltd.) as an electrolyte to prepare 3019.4 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 5 hour at the temperature of 80 degrees C. respectively to growth particles.

The equivalent ratio $E_A/E_E$ between the alkali in the solution B and the electrolyte is 0.8. After aging is performed for one hour at 80 degrees C., the core particle dispersion liquid in which particles have been grown is cleaned with a ultrafiltration until the pH is adjusted to 10.4. Then the dispersion liquid is condensed to obtain a sol of spinous silica particles with the SiO$_2$ concentration of 20% by weight.

Example 9

Preparation of Core Particles Dispersion Liquid

The core particles dispersion liquid (solution A) is prepared like in Example 7.

Growth of Core Particles 708 grams of water glass (produced by AGC Si-Tech CO., Ltd: JIS NO.3 water glass with the SiO$_2$ concentration of 24% by weight) is diluted with 2692 grams of water to prepare 3400 grams of aqueous solution of alkali silicate (solution B). Furthermore, 2971 grams of water is added to 48.9 grams of ammonium chloride (produced by Mitsubishi Chemicals Co., Ltd.) as an electrolyte to prepare 3019.9 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 5 hours at the temperature of 80 degrees C. respectively to growth particles.

The equivalent ratio $E_A/E_E$ between the alkali in the solution B and the electrolyte is 1.0. After aging is performed for one hour at 80 degrees C., the core particle dispersion liquid in which particles have been grown is cleaned with a ultrafiltration until the pH is adjusted to 10.3. Then the dispersion liquid is condensed to obtain a sol of spinous silica particles with the SiO$_2$ concentration of 20% by weight.

Comparative Example 1

Preparation of Core Particle Dispersion Liquid

Water is added to 15.1 grams of silica sol (produced by Catalysts & Chemicals Industries Co. Ltd., Cataloid SI-50 with the average diameter (measured by the image analysis method) of 35.8 nm and the SiO$_2$ concentration of 48.4% by weight) to obtain a solution (with the SiO$_2$ concentration of 1% by weight) with the total weight of 730 grams, and then an aqueous solution of sodium hydroxide with the concentration of 5% by weight is added so that the pH of the silica sol is adjusted to 11. Then a temperature of the silica sol is raised to 95 degrees C., and the solution is kept at 95 degrees C. for 30 minutes to obtain a core particle dispersion liquid (solution A).

Growth of Core Particles 888 grams of water glass (produced by AGC Si-Tech CO., Ltd: JIS NO.3 water glass with the SiO$_2$ concentration of 24% by weight) is diluted with 4400 grams of water to prepare 5288 grams of aqueous solution of alkali silicate (solution B). Furthermore, 4800 grams of water is added to 151.3 grams of ammonium sulfate (produced by Mitsubishi Chemicals Co., Ltd.) as an electrolyte to prepare 4951.3 grams of an aqueous solution of the electrolyte. Then, the aqueous solution of alkali silicate (solution B) and the aqueous solution of electrolyte are added to all of the core particle dispersion liquid (solution A) kept at the temperature of 95 degrees C. over 9 hours at the temperature of 95 degrees C. respectively to growth particles.

The equivalent ratio $E_A/E_E$ between the alkali in the solution B and the electrolyte is 1.0. After aging is performed for one hour at 95 degrees C., the core particle dispersion liquid in which particles have been grown is cleaned with a ultrafiltration until the pH is adjusted to 9.8. Then the dispersion liquid is condensed to obtain a sol of spinous silica particles with the SiO$_2$ concentration of 20% by weight.

In Comparative Example 1, a specific surface area of the particles in the silica sol is measured by the nitrogen adsorption method.

Example 10

Preparation of Core Particle Dispersion Liquid

Water is added to 126.7 grams of silica sol (with the average diameter (measured by the image analysis method) of 16.9 nm and the SiO$_2$ concentration of 30.7% by weight) to obtain a solution with the total weight of 3890 grams (with the SiO$_2$ concentration of 1% by weight). Furthermore, an aqueous solution of sodium hydroxide with the concentration of 5% by weight is added until pH of the silica sol is adjusted to 11. Then the silica sol is warmed up to 80 degrees C., and is kept at the temperature of 80 degrees C. for 30 minutes to prepare a core particle dispersion liquid (solution A).

Growth of Core Particles 588 grams of water glass (produced by AGC Si-Tech CO., Ltd: JIS NO.3 water glass with the SiO$_2$ concentration of 24% by weight) is diluted with 2232 grams of water to prepare 2820 grams of aqueous solution of alkali silicate (solution B). Furthermore, 2412 grams of water is added to 93.3 grams of ammonium nitrate (produced by Mitsubishi Chemicals Co., Ltd.) as an electrolyte to prepare 32505.3 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 0.65. After aging is performed for one hour at 80 degrees C., the core particle dispersion liquid in which particles have been grown is cleaned with a ultrafiltration until the pH is adjusted to 9.8. Then the dispersion liquid is condensed to obtain a sol of spinous silica particles with the SiO$_2$ concentration of 20% by weight.

Example 11

Preparation of Core Particle Dispersion Liquid

The core particle dispersion liquid (solution A) is prepared like in Example 10.

Growth of Core Particles 588 grams of water glass (produced by AGC Si-Tech CO., Ltd: JIS NO.3 water glass with the SiO$_2$ concentration of 24% by weight) is diluted with 2232 grams of water to prepare 2820 grams of aqueous solution of alkali silicate (solution B). Furthermore, 2405 grams of water is added to 100.2 grams of ammonium sulfate (produced by Mitsubishi Chemicals Co., Ltd.) as an electrolyte to prepare 2505.2 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 1.0. After aging is performed for one hour at 80 degrees C., the core particle dispersion liquid in which particles have been grown is cleaned with a ultrafiltration until the pH is adjusted to 9.2. Then the dispersion liquid is condensed to obtain a sol of spinous silica particles with the $SiO_2$ concentration of 20% by weight.

Example 12

Preparation of Core Particle Dispersion Liquid

The core particle dispersion liquid (solution A) is prepared line in Example 1.

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2425 grams of water is added to 24.5 grams of ammonium sulfate (produced by Mitsubishi Chemicals Co., Ltd.) as an electrolyte to prepare 2449.5 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 4.0. After aging is performed for one hour at 80 degrees C., the core particle dispersion liquid in which particles have been grown is cleaned with a ultrafiltration until the pH is adjusted to 9.9. Then the dispersion liquid is condensed to obtain a sol of spinous silica particles with the $SiO_2$ concentration of 20% by weight.

Example 13

Preparation of Core Particle Dispersion Liquid

The core particle dispersion liquid (solution A) is prepared line in Example 1.

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2435 grams of water is added to 14.8 grams of ammonium nitrate (produced by Mitsubishi Chemicals Co., Ltd.) as an electrolyte to prepare 2449.8 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 4.0. After aging is performed for one hour at 80 degrees C., the core particle dispersion liquid in which particles have been grown is cleaned with a ultrafiltration until the pH is adjusted to 10.4. Then the dispersion liquid is condensed to obtain a sol of spinous silica particles with the $SiO_2$ concentration of 20% by weight.

Example 14

Preparation of Core Particle Dispersion Liquid

The core particle dispersion liquid (solution A) is prepared line in Example 1.

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2400 grams of water is added to 9.9 grams of ammonium chloride (produced by Mitsubishi Chemicals Co., Ltd.) as an electrolyte to prepare 2449.9 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 4.0. After aging is performed for one hour at 80 degrees C., the core particle dispersion liquid in which particles have been grown is cleaned with a ultrafiltration until the pH is adjusted to 9.9. Then the dispersion liquid is condensed to obtain a sol of spinous silica particles with the $SiO_2$ concentration of 20% by weight.

Example 15

Preparation of Core Particle Dispersion Liquid

The core particle dispersion liquid (solution A) is prepared line in Example 1.

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2359 grams of water is added to 91.4 grams of ammonium nitrate (produced by Mitsubishi Chemicals Co., Ltd.) as an electrolyte to prepare 2450.4 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 0.65. After aging is performed for one hour at 80 degrees C., the core particle dispersion liquid in which particles have been grown is cleaned with a ultrafiltration until the pH is adjusted to 9.9. Then the dispersion liquid is condensed to obtain a sol of spinous silica particles with the $SiO_2$ concentration of 20% by weight.

Example 16

Preparation of Core Particle Dispersion Liquid

The core particle dispersion liquid (solution A) is prepared line in Example 1.

Growth of Core Particles 575 grams of water glass (produced by AGC Si-Tech CO., Ltd: JIS NO.3 water glass with the $SiO_2$ concentration of 24% by weight) is diluted with 2185 grams of water to prepare 2760 grams of aqueous solution of alkali silicate (solution B). Furthermore, 2371 grams of water is added to 79.4 grams of ammonium chloride (produced by Mitsubishi Chemicals Co., Ltd.) as an electrolyte to prepare 2450.4 grams of an aqueous solution of the electrolyte. Then, the aqueous solution of alkali silicate (solution B) and the aqueous solution of electrolyte are added to all of the core particle dispersion liquid (solution A) kept at the temperature of 80 degrees C. over 1 hour at the temperature of 80 degrees C. respectively to growth particles.

The equivalent ratio $E_A/E_E$ between the alkali in the solution B and the electrolyte is 0.5. After aging is performed for one hour at 80 degrees C., the core particle dispersion liquid in which particles have been grown is cleaned with a ultrafiltration until the pH is adjusted to 9.5. Then the dispersion liquid is condensed to obtain a sol of spinous silica particles with the $SiO_2$ concentration of 20% by weight.

Example 17

Preparation of Core Particle Dispersion Liquid
The core particle dispersion liquid (solution A) is prepared line in Example 1.
Growth of Core Particles
140.8 grams of water glass (produced by AGC Si-Tech CO., Ltd: JIS NO.3 water glass with the $SiO_2$ concentration of 24% by weight) is diluted with 535.2 grams of water to prepare 676 grams of aqueous solution of alkali silicate (solution B). Furthermore, 590 grams of water is added to 9.7 grams of ammonium chloride (produced by Mitsubishi Chemicals Co., Ltd.) as an electrolyte to prepare 599.7 grams of an aqueous solution of the electrolyte. Then, the aqueous solution of alkali silicate (solution B) and the aqueous solution of electrolyte are added to all of the core particle dispersion liquid (solution A) kept at the temperature of 95 degrees C. over 15 minutes at the temperature of 95 degrees C. respectively to growth particles.
The equivalent ratio $E_A/E_E$ between the alkali in the solution B and the electrolyte is 1.0. After aging is performed for one hour at 95 degrees C., the core particle dispersion liquid in which particles have been grown is cleaned with a ultrafiltration until the pH is adjusted to 10.5. Then the dispersion liquid is condensed to obtain a sol of spinous silica particles with the $SiO_2$ concentration of 20% by weight.

Comparative Example 2

Pure water is added to a silica sol (produced by Catalysts & Chemicals Industries Co. Ltd., Cataloid SI-50 with the average diameter (measured by the image analysis method) of 35.8 nm and with the $SiO_2$ concentration of 48.4% by weight) to adjust the $SiO_2$ concentration to 20% by weight.

Comparative Example 3

Pure water is added to a silica sol (produced by Catalysts & Chemicals Industries Co. Ltd., Cataloid SI-40 with the average diameter (measured by the image analysis method) of 21.2 nm and with the $SiO_2$ concentration of 40.7% by weight) to adjust the $SiO_2$ concentration to 20% by weight.

Comparative Example 4

Pure water is added to a silica sol (produced by Catalysts & Chemicals Industries Co. Ltd., Cataloid SI-45 with the average diameter (measured by the image analysis method) of 55.3 nm and with the $SiO_2$ concentration of 40.3% by weight) to adjust the $SiO_2$ concentration to 20% by weight.
In Comparative Example 4, a specific surface area of each particle in the silica sol is measured by the nitrogen adsorption method.

Comparative Example 5

Pure water is added to a silica sol (produced by Catalysts & Chemicals Industries Co. Ltd., Cataloid SI-80 with the average diameter (measured by the image analysis method) of 110 nm and with the $SiO_2$ concentration of 40.5% by weight) to adjust the $SiO_2$ concentration to 20% by weight.
In Comparative Example 5, a specific surface area of each particle in the silica sol is measured by the nitrogen adsorption method.

TABLE 1

| | Preparation | | Spinous Silica Particle (Spinous Silica Sol) | | | | | | | | | | Polising Property | |
|---|---|---|---|---|---|---|---|---|---|---|---|---|---|---|
| | | Silica in B/100 | | | | | | | | | | | | |
| | $E_A/E_E$ | weight portions of Silica in A portion weight | SA1 m²/g | D2 nm | SA2 m²/g | SA1/ SA2 | Sphericity | Na₂O % | Cl ppm | SO₄ ppm | NO₃ ppm | CV Value % | Polishing Speed | Polishing Rate |
| Ex. 1 | 1.0 | 331 | 201 | 35.8 | 76.2 | 2.64 | 0.94 | 0.2 | <5 | 200 | <5 | 26 | 36.3 | 1.21 |
| Ex. 2 | 1.0 | 331 | 271 | 33.4 | 81.6 | 3.32 | 0.91 | 0.3 | <5 | 200 | <5 | 27 | 39.3 | 1.31 |
| Ex. 3 | 0.8 | 331 | 229 | 33.4 | 81.6 | 2.81 | 0.91 | 0.3 | <5 | <5 | <5 | 27 | 38.1 | 1.27 |
| Ex. 4 | 0.8 | 331 | 322 | 32.6 | 83.7 | 3.85 | 0.91 | 0.3 | <5 | <5 | 10 | 28 | 40.8 | 1.36 |
| Ex. 5 | 1.0 | 331 | 225 | 34.0 | 80.2 | 2.81 | 0.92 | 0.3 | 25 | <5 | <5 | 27 | 42.6 | 1.42 |
| Ex. 6 | 1.0 | 331 | 319 | 32.0 | 85.2 | 3.74 | 0.91 | 0.4 | <5 | <5 | <5 | 27 | 40.5 | 1.35 |
| Ex. 7 | 1.0 | 1683 | 192 | 59.0 | 46.2 | 4.16 | 0.94 | 0.2 | <5 | 250 | <5 | 20 | 32.8 | 1.18 |
| Ex. 8 | 0.8 | 1683 | 344 | 55.0 | 49.6 | 6.94 | 0.93 | 0.4 | <5 | <5 | 10 | 21 | 38.1 | 1.37 |
| Ex. 9 | 1.0 | 1683 | 392 | 53.2 | 51.2 | 7.66 | 0.93 | 0.4 | <5 | <5 | <5 | 22 | 33.4 | 1.2 |
| Comp Ex. 1 | 1.0 | 2918 | 34(*) | 115.0 | 23.7 | 1.43 | 0.98 | 0.2 | <5 | 230 | <5 | 60 | 38.1 | 1.1 |
| Ex. 10 | 0.65 | 362 | 268 | 24.7 | 110.4 | 2.43 | 0.88 | 0.2 | <5 | <5 | 10 | 35 | 57.2 | 1.51 |
| Ex. 11 | 1.0 | 362 | 197 | 26.3 | 103.7 | 1.90 | 0.89 | 0.2 | <5 | 180 | <5 | 34 | 44.7 | 1.18 |
| Ex. 12 | 4.0 | 331 | 257 | 31.1 | 87.7 | 2.93 | 0.91 | 0.3 | <5 | 50 | <5 | 32 | 43.8 | 1.46 |
| Ex. 13 | 4.0 | 331 | 245 | 27.7 | 98.5 | 2.49 | 0.91 | 0.4 | <5 | <5 | <5 | 33 | 42.3 | 1.41 |
| Ex. 14 | 4.0 | 331 | 239 | 27.5 | 99.2 | 2.41 | 0.90 | 0.3 | <5 | <5 | <5 | 33 | 36.3 | 1.21 |
| Ex. 15 | 0.65 | 331 | 259 | 36.7 | 74.3 | 3.48 | 0.93 | 0.3 | <5 | <5 | 10 | 30 | 43.5 | 1.45 |
| Ex. 16 | 0.5 | 331 | 163 | 37.5 | 72.7 | 2.24 | 0.93 | 0.2 | 20 | <5 | <5 | 31 | 36.6 | 1.22 |
| Ex. 17 | 1.0 | 81 | 185 | 26.2 | 104.1 | 1.78 | 0.90 | 0.3 | 20 | <5 | <5 | 33 | 40.8 | 1.36 |
| Comp Ex. 2 | — | — | 100 | 35.8 | 76.2 | 1.31 | 0.90 | 0.2 | — | — | — | 53 | 30 | — |
| Comp Ex. 3 | — | — | 158 | 21.2 | 128.6 | 1.23 | 0.87 | 0.2 | — | — | — | 70 | 37.9 | — |
| Comp Ex. 4 | — | — | 61(*) | 55.3 | 49.3 | 1.24 | 0.93 | 0.2 | — | — | — | 35 | 27.8 | — |
| Comp Ex. 5 | — | — | 34(*) | 110.0 | 24.8 | 1.37 | 0.96 | 0.3 | — | — | — | 55 | 34.6 | — |

(*)Values measured by nitrogen gas adsorption method

Example 21

Pure water is added to 2500 grams of a silica sol as a raw material (Cataloid SI-45P with 45 nm of the average particle diameter converted from a specific surface area measured by the nitrogen adsorption method, produced by Catalysts & Chemicals Industries Co. Ltd., and with the silica concentration, specific surface area, and form as shown in Table 2) to adjust the silica concentration to 15.4% by weight.

850 grams of an aqueous solution of sodium aluminate [$NaAlO_2$] with the sodium aluminate concentration of 0.9% by weight is homogeneously added to 6500 grams of the silica sol at the temperature of 12 degrees C. with agitation over 4 hours (0.77 weight portions of sodium aluminate vs. 100 weight portions of silica content in the silica sol). Then the solution is heated to 90 degrees C., and aged for three hours.

A content of solid phase (alumina-coated silica particles) in the obtained dispersion liquid of alumina-coated silica particles is measured by the solid phase measurement method as described in [12] above to find that the content is 13.7% by weight. Pure water is added to 1199 grams of the aqueous solution of alumina-coated silica particles to adjust the concentration to 2.9% by weight.

27 grams of water glass No. 3 with the silica concentration of 24% by weight is added to 5586 grams of the aqueous solution of alumina-coated silica particles (4.0 weight portions of silica content vs. 100 weight portions of alumina-coated silica particles). The mixed solution is heated to 98 degrees C. and is aged for 30 minutes at the temperature. Then 4305 grams of silicic acid solution with the silica concentration of 3% by weight is gradually added over 7 hours to the aged solution above with agitation (75.6 weight portions of silica content in the silicic acid solution vs. 100 weight portions of silica content in the aqueous solution of alumina-coated silica particles after completion of aging). After the addition is finished, the mixed solution is aged for 1 hour at 98 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

Example 22

Pure water is added to 2500 grams of a silica sol as a raw material (Cataloid SI-80P with 80 nm of the average particle diameter converted from a specific surface area measured by the nitrogen adsorption method, produced by Catalysts & Chemicals Industries Co. Ltd., and with the silica concentration, specific surface area, and form as shown in Table 2) to adjust the silica concentration to 15.4% by weight.

482 grams of an aqueous solution of sodium aluminate [$NaAlO_2$] with the sodium aluminate concentration of 0.9% by weight is homogeneously added to 6500 grams of the silica sol at the temperature of 14 degrees C. with agitation over 2 hours (0.43 weight portions of sodium aluminate vs. 100 weight portions of silica content in the silica sol). Then the solution is heated to 90 degrees C., and aged for three hours.

A content of solid phase (alumina-coated silica particles) in the obtained dispersion liquid of alumina-coated silica particles is measured by the solid phase measurement method as described in [12] above to find that the content is 14.4% by weight. Pure water is added to 1463 grams of the aqueous solution of alumina-coated silica particles to adjust the concentration to 2.7% by weight.

41 grams of water glass No. 3 with the silica concentration of 24% by weight is added to 7163 grams of the aqueous solution of alumina-coated silica particles (3.7 weight portions of silica content vs. 100 weight portions of alumina-coated silica particles). The mixed solution is heated to 98 degrees C. and is aged for 30 minutes at the temperature. Then 2641 grams of silicic acid solution with the silica concentration of 3% by weight is gradually added over 10 hours to the aged solution above with agitation (32.4 weight portions of silica content in the silicic acid solution vs. 100 weight portions of silica content in the aqueous solution of alumina-coated silica particles after completion of aging). After the addition is finished, the mixed solution is aged for 1 hour at 98 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

Example 23

Pure water is added to 2083 grams of a silica sol as a raw material (Cataloid SI-25 with 50 nm of the average particle diameter converted from a specific surface area measured by the sodium dripping method, produced by Catalysts & Chemicals Industries Co. Ltd., and with the silica concentration, specific surface area, and form as shown in Table 2) to adjust the silica concentration to 15.4% by weight.

1488 grams of an aqueous solution of sodium aluminate [$NaAlO_2$] with the sodium aluminate concentration of 0.9% by weight is homogeneously added to 6500 grams of the silica sol at the temperature of 25 degrees C. with agitation over 6 hours (1.34 weight portions of sodium aluminate vs. 100 weight portions of silica content in the silica sol). Then the solution is heated to 90 degrees C., and aged for three hours.

A content of solid phase (alumina-coated silica particles) in the obtained dispersion liquid of alumina-coated silica particles is measured by the solid phase measurement method as described in [12] above to find that the content is 12.7% by weight. Pure water is added to 882 grams of the aqueous solution of alumina-coated silica particles to adjust the concentration to 2.8% by weight.

48 grams of water glass No. 3 with the silica concentration of 24% by weight is added to 4704 grams of the aqueous solution of alumina-coated silica particles (10.1 weight portions of silica content vs. 100 weight portions of alumina-coated silica particles). The mixed solution is heated to 87 degrees C. and is aged for 30 minutes at the temperature. Then 5961 grams of silicic acid solution with the silica concentration of 3% by weight is gradually added over 7 hours to the aged solution above with agitation (150 weight portions of silica content in the silicic acid solution vs. 100 weight portions of silica content in the aqueous solution of alumina-coated silica particles after completion of aging). After the addition is finished, the mixed solution is aged for 1 hour at 87 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the sodium dripping method, and the average particle diameter is measured by the image analysis method. In addition, the specific surface area and sphericity are obtained from the parameters above to calculate the surface roughness. The result is shown in Table 2.

Example 24

Pure water is added to 2500 grams of a silica sol as a raw material (Cataloid SI-45P with 45 nm of the average particle diameter converted from a specific surface area measured by the nitrogen adsorption method, produced by Catalysts & Chemicals Industries Co. Ltd., and with the silica concentration, specific surface area, and form as shown in Table 2) to adjust the silica concentration to 15.4% by weight.

142 grams of an aqueous solution of sodium aluminate [$NaAlO_2$] with the sodium aluminate concentration of 0.9% by weight is homogeneously added to 6500 grams of the silica sol at the temperature of 25 degrees C. with agitation over 30 minutes (0.13 weight portions of sodium aluminate vs. 100 weight portions of silica content in the silica sol). Then the solution is heated to 90 degrees C., and aged for three hours.

A content of solid phase (alumina-coated silica particles) in the obtained dispersion liquid of alumina-coated silica particles is measured by the solid phase measurement method as described in [12] above to find that the content is 15.1% by weight. Pure water is added to 1199 grams of the aqueous solution of alumina-coated silica particles to adjust the concentration to 2.9% by weight.

27 grams of water glass No. 3 with the silica concentration of 24% by weight is added to 6243 grams of the aqueous solution of alumina-coated silica particles (4.0 weight portions of silica content vs. 100 weight portions of alumina-coated silica particles). The mixed solution is heated to 98 degrees C. and is aged for 30 minutes at the temperature. Then 4305 grams of silicic acid solution with the silica concentration of 3% by weight is gradually added over 7 hours to the aged solution above with agitation (75.6 weight portions of silica content in the silicic acid solution vs. 100 weight portions of silica content in the aqueous solution of alumina-coated silica particles after completion of aging). After the addition is finished, the mixed solution is aged for 1 hour at 98 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

Example 25

Pure water is added to 2500 grams of a silica sol as a raw material (Cataloid SI-45P with 45 nm of the average particle diameter converted from a specific surface area measured by the nitrogen adsorption method, produced by Catalysts & Chemicals Industries Co. Ltd., and with the silica concentration, specific surface area, and form as shown in Table 2) to adjust the silica concentration to 15.4% by weight.

1983 grams of an aqueous solution of sodium aluminate [$NaAlO_2$] with the sodium aluminate concentration of 0.9% by weight is homogeneously added to 6500 grams of the silica sol at the temperature of 25 degrees C. with agitation over 8 hours (1.79 weight portions of sodium aluminate vs. 100 weight portions of silica content in the silica sol). Then the solution is heated to 90 degrees C., and aged for three hours.

A content of solid phase (alumina-coated silica particles) in the obtained dispersion liquid of alumina-coated silica particles is measured by the solid phase measurement method as described in [12] above to find that the content is 12.0% by weight. Pure water is added to 1199 grams of the aqueous solution of alumina-coated silica particles to adjust the concentration to 2.9% by weight.

22 grams of water glass No. 3 with the silica concentration of 24% by weight is added to 4552 grams of the aqueous solution of alumina-coated silica particles (6.0 weight portions of silica content vs. 100 weight portions of alumina-coated silica particles). The mixed solution is heated to 98 degrees C. and is aged for 30 minutes at the temperature. Then 4343 grams of silicic acid solution with the silica concentration of 3% by weight is gradually added over 7 hours to the aged solution above with agitation (75.6 weight portions of silica content in the silicic acid solution vs. 100 weight portions of silica content in the aqueous solution of alumina-coated silica particles after completion of aging). After the addition is finished, the mixed solution is aged for 1 hour at 98 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

Comparative Example 21

Pure water is added to 407 grams of a silica sol as a raw material (Cataloid SI-45P with 45 nm of the average particle diameter converted from a specific surface area measured by the nitrogen adsorption method, produced by Catalysts & Chemicals Industries Co. Ltd., and with the silica concentration, specific surface area, and form as shown in Table 2) to adjust the silica concentration to 2.8% by weight.

40 grams of water glass No. 3 with the silica concentration of 24% by weight is added to 5761 grams of the silica sol (6.0 weight portions of silica content in the water glass No. 3 vs. 100 weight portions of silica particles in the silica sol). The mixed solution is heated to 98 degrees C. and is aged for 30 minutes at the temperature. Then 4199 grams of silicic acid solution with the silica concentration of 3% by weight is gradually added over 7 hours to the aged solution above with agitation (75.6 weight portions of silica content in the silicic acid solution vs. 100 weight portions of silica particles in the silica sol). After the addition is finished, the mixed solution is aged for 1 hour at 98 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

Comparative Example 22

Pure water is added to 228 grams of a silica sol as a raw material (Cataloid SI-50 with 25 nm of the average particle diameter converted from a specific surface area measured by the sodium dripping method, produced by Catalysts & Chemicals Industries Co. Ltd., and with the silica concentration, specific surface area, and form as shown in Table 2) to adjust the silica concentration to 2.8% by weight.

46 grams of water glass No. 3 with the silica concentration of 24% by weight is added to 3972 grams of the silica sol (10.1 weight portions of silica content in the water glass No. 3 vs. 100 weight portions of silica particles in the silica sol). The mixed solution is heated to 98 degrees C. and is aged for 30 minutes at the temperature. Then 5983 grams of silicic acid solution with the silica concentration of 3% by weight is gradually added over 7 hours at 87 degrees C. to the aged solution above with agitation (150 weight portions of silica content in the silicic acid solution vs. 100 weight portions of silica particles in the silica sol). After the addition is finished, the mixed solution is aged for 1 hour at 87 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

Comparative Example 23

Pure water is added to 2500 grams of a silica sol as a raw material (Cataloid SI-45P with 45 nm of the average particle diameter converted from a specific surface area measured by the nitrogen adsorption method, produced by Catalysts & Chemicals Industries Co. Ltd., and with the silica concentration, specific surface area, and form as shown in Table 2) to adjust the silica concentration to 15.4% by weight.

2833 grams of an aqueous solution of sodium aluminate [$NaAlO_2$] with the sodium aluminate concentration of 0.9% by weight is homogeneously added to 6500 grams of the silica sol at the temperature of 25 degrees C. with agitation over 12 hours (2.55 weight portions of sodium aluminate vs. 100 weight portions of silica content in the silica sol). Then the solution is heated to 90 degrees C., and aged for three hours.

A content of solid phase (alumina-coated silica particles) in the obtained dispersion liquid of alumina-coated silica particles is measured by the solid phase measurement method as described in [12] above to find that the content is 11.0% by weight. Pure water is added to 1494 grams of the aqueous solution of alumina-coated silica particles to adjust the concentration to 2.9% by weight.

41 grams of water glass No. 3 with the silica concentration of 24% by weight is added to 8483 grams of the aqueous solution of alumina-coated silica particles (6.0 weight portions of silica content vs. 100 weight portions of alumina-coated silica particles). The mixed solution is heated to 98 degrees C. and is aged for 30 minutes at the temperature. Then 4190 grams of silicic acid solution with the silica concentration of 3% by weight is gradually added over 7 hours to the aged solution above with agitation (75.6 weight portions of silica content in the silicic acid solution vs. 100 weight portions of silica content in the aqueous solution of alumina-coated silica particles after completion of aging). After the addition is finished, the mixed solution is aged for 1 hour at 98 degrees C.

Then the mixed solution is condensed with an ultrafiltration film (SIP-1013) supplying pure water so that a surface of the solution is kept at a constant level, until a conductivity of the aqueous solution is stabilized at a constant level. Then the aqueous solution is condensed to 12% by weight, and is furthermore condensed with a rotary evaporator until the concentration is adjusted to 30%. Then the specific surface area is measured by the nitrogen adsorption method, and the average particle diameter is measured by the image analysis method. In addition, the specific surface area and sphericity are obtained from the parameters above to calculate the surface roughness. The result is shown in Table 2.

TABLE 2

| | | | | Examples | | | | | Comp. Examples | | |
|---|---|---|---|---|---|---|---|---|---|---|---|
| | | | | 21 | 22 | 23 | 24 | 25 | 21 | 22 | 23 |
| Material | Silica Sol | Av. PD | nm | 45 | 80 | 25 | 45 | 45 | 45 | 25 | 45 |
| | | pH | | 10.0 | 10.1 | 9.0 | 10.0 | 10.0 | 10.0 | 9.0 | 10.0 |
| | | $SiO_2$ Conc. | wt % | 40 | 40 | 48 | 40 | 40 | 40 | 48 | 40 |
| | | SA | m²/g | 61 | 34 | 109 | 34 | 34 | 61 | 109 | 61 |
| | | Form | | Spher. | Spher. | Spher. | Spher. | Spher. | Spher. | Spher. | Spher. |
| | | CV Value | % | 24 | 18 | 35 | 27 | 29 | 24 | 35 | 24 |
| | After dilution | $SiO_2$ Conc. | wt % | 15.4 | 15.4 | 15.4 | 15.4 | 15.4 | 2.8 | 2.8 | 15.4 |
| | | pH | | 10.52 | 10.51 | 9.59 | 10.52 | 10.52 | — | — | 10.52 |
| Surface Processing with | Silica Sol | Amount | g | 6,500 | 6,500 | 6,500 | 6,500 | 6,500 | 0 | 0 | 6,500 |
| | | Conc. | wt % | 15.4 | 15.4 | 15.4 | 15.4 | 15.4 | 2.8 | 2.8 | 15.4 |
| | | Weight | g | 1,001 | 1,001 | 1,001 | 1,001 | 1,001 | 0 | 0 | 1,001 |

TABLE 2-continued

|  |  |  |  | Examples | | | | | Comp. Examples | | |
|---|---|---|---|---|---|---|---|---|---|---|---|
|  |  |  |  | 21 | 22 | 23 | 24 | 25 | 21 | 22 | 23 |
| Alumina | Aq soln | Amount | g | 850 | 482 | 1,488 | 142 | 1,983 | 0 | 0 | 2,833 |
|  | of | Conc. | wt % | 0.9 | 0.9 | 0.9 | 0.9 | 0.9 | 0 | 0 | 0.9 |
|  | NaAlO$_2$ | Weight | g | 7.7 | 4.3 | 13.4 | 1.3 | 17.8 | 0.00 | 0.00 | 25.5 |
|  | Mass | Silica | wt port. | 100 | 100 | 100 | 100 | 100 | 0 | 0 | 100 |
|  | Ratio | NaAlO$_2$ | wt port. | 0.76 | 0.43 | 1.34 | 0.13 | 1.78 | 0.00 | 0.00 | 2.55 |
|  | Addition | Temp | C.° | 12 | 14 | 25 | 25 | 25 | — | — | 23 |
|  |  | Time | Hrs. | 4 | 2 | 6 | 0.5 | 8 | — | — | 12 |
|  | Aging | Temp | C.° | 90 | 90 | 90 | 90 | 90 | — | — | 90 |
|  |  | Time | Hrs. | 3 | 3 | 3 | 3 | 3 | — | — | 3 |
|  |  | pH |  | 11.1 | 11.1 | 10.9 | 10.7 | 11.4 | — | — | 11.5 |
| Preparation | Coated | Amount | g | 5,586 | 7,163 | 4,074 | 6,243 | 4,552 | 5,761 | 3,972 | 8,483 |
| of | Silica Sol | Conc. | wt % | 2.9 | 2.7 | 2.8 | 2.9 | 2.9 | 2.8 | 2.8 | 2.9 |
| Dispersion |  | Weight | g | 162 | 730 | 114 | 162 | 132 | 161 | 111 | 246 |
| liquid of | Water | Amount | g | 27.0 | 41.0 | 48.0 | 27.0 | 22.0 | 40.0 | 46.0 | 41.0 |
| particles | Glass | SiO$_2$ Conc. | wt % | 24 | 24 | 24 | 24 | 24 | 24 | 24 | 24 |
|  |  | SiO2 | g | 6.5 | 27.0 | 11.5 | 6.5 | 5.3 | 9.6 | 11.0 | 9.8 |
|  |  | SiO$_2$/Na$_2$O | Mol Rat. | 3 | 3 | 3 | 3 | 3 | 3 | 3 | 3 |
|  | Mass | Coated P. | wt port. | 100 | 100 | 100 | 100 | 100 | 100 | 100 | 100 |
|  | Ratio | WG SiO$_2$ | wt port. | 4.0 | 3.7 | 10.1 | 4.0 | 4.0 | 6.0 | 10.0 | 4.0 |
|  | Addition | Temp |  | r.t. | r.t. | r.t. | r.t. | r.t. | r.t. | r.t. | r.t. |
|  | of WG | pH |  | 10.72 | 10.5 | 11.1 | 10.45 | 10.51 | 10.69 | 11.01 | 10.52 |
|  | Aging | Temp | C.° | 98 | 98 | 87 | 98 | 98 | 98 | 87 | 98 |
|  |  | Time | Hrs. | 0.5 | 0.5 | 0.5 | 0.5 | 0.5 | 0.5 | 0.5 | 0.5 |
| Particle | coated p | Weight | g | 162 | 730 | 114 | 162 | 132 | 161 | 111 | 246 |
| Growth | Silicic Acid | Amount | g | 4,305 | 2,641 | 5,961 | 4,305 | 4,343 | 4,199 | 5,983 | 4,190 |
|  | Soln | Conc. | wt % | 3 | 3 | 3 | 3 | 3 | 3 | 3 | 3 |
|  |  | Silica | g | 129.2 | 79.2 | 178.8 | 129.2 | 130.3 | 126.0 | 179.5 | 125.7 |
|  | Addition | Coated P. | wt port. | 100 | 100 | 100 | 100 | 100 | 100 | 100 | 100 |
|  | of Silicic | SiO2 | wt port. | 79.7 | 10.9 | 156.9 | 79.7 | 98.7 | 78.2 | 161.7 | 51.1 |
|  | Acid Soln | Time | Hrs. | 7 | 10 | 7 | 7 | 7 | 7 | 7 | 7 |
|  |  | Temp | C.° | 98 | 98 | 87 | 98 | 98 | 98 | 87 | 98 |
| Aging |  | Temp | C.° | 98 | 98 | 87 | 98 | 98 | 98 | 87 | 98 |
|  |  | Time | Hrs. | 1 | 1 | 1 | 1 | 1 | 1 | 1 | 1 |
|  |  | pH |  | 10.4 | 10.2 | 9.9 | 10.4 | 10.5 | 10.4 | 9.8 | 10.3 |
|  | Product | D2 | nm | 77 | 125 | 52 | 73 | 76 | 73 | 48 | 74 |
|  |  | SA2 | m$^2$/g | 36 | 22 | 52 | 37 | 36 | 37 | 57 | 37 |
|  |  | SA1 | m$^2$/g | 74 | 50 | 115 | 66 | 148 | 51 | 88 | 50 |
|  |  | SA1/SA2 | Ave. | 2.08 | 2.3 | 2.2 | 1.8 | 4.1 | 1.4 | 1.5 | 1.3 |
|  |  | DS/DL | Ave. | 0.90 | 0.93 | 0.88 | 0.90 | 0.86 | 0.95 | 0.92 | 0.92 |
|  |  | Solid Conc. | wt % | 30 | 30 | 30 | 30 | 30 | 30 | 30 | 30 |
|  |  | pH |  | 10.3 | 10.1 | 9.9 | 10.2 | 10.3 | 10.5 | 10.2 | 10.3 |
|  |  | D3 | nm | 59 | 107 | 42 | 63 | 52 | — | — | — |
|  |  | HP | nm | 9 | 9 | 5 | 5 | 12 | — | — | — |
|  |  | D3/HP |  | 100/15 | 100/8 | 100/12 | 100/8 | 100/23 | — | — | — |
|  |  | CV Value | % | 25 | 20 | 35 | 28 | 30 | 27 | 34 | 60 |

Example 26

2.3 grams of a sol of silica particles with the average particle diameter of 5 nm calculated from a specific surface area measured by the nitrogen adsorption method and also with the SiO$_2$ concentration of 20% (produced by Catalysts & Chemicals Industries Co. Ltd., Cataloid SI-550) is heated to 87 degrees C. and is kept at the temperature for 30 minute. Then the solution is kept at the 87 degrees C., and 2489 grams of an aqueous solution of sodium tetraborate (Na$_2$B$_4$O$_7$) with the concentration of 1% by weight and 2489 grams of water glass with the SiO$_2$ concentration of 3.0% by weight are simultaneously added to the solution over 14 hours. After completion of the addition, the mixed solution is cooled to the room temperature, and is condensed to the SiO$_2$ concentration of 12% by weight with a ultrafiltration film (produced by Asahi Chemicals Co., Ltd, Microsa 1013). The pH is 9.5. The solution is further condensed with a rotary evaporator to the SiO$_2$ concentration of 40.5% by weight. The obtained particles contain B$_2$O$_3$ by 0.38% by weight. The average particle diameter obtained from image analysis of the TEM image is 46 nm. A result of analysis of the spinous silica particles is shown in Table 3.

Example 27

2.3 grams of a sol of silica particles with the average particle diameter of 5 nm calculated from a specific surface area measured by the nitrogen adsorption method and also with the SiO$_2$ concentration of 20% (produced by Catalysts & Chemicals Industries Co. Ltd., Cataloid SI-550) is heated to 87 degrees C. and is kept at the temperature for 30 minutes. Then the solution is kept at the 87 degrees C., and 995 grams of an aqueous solution of sodium tetraborate (Na$_2$B$_4$O$_7$) with the concentration of 1% by weight and 2986 grams of water glass with the SiO$_2$ concentration of 3.0% by weight are simultaneously added to the solution over 14 hours. After completion of the addition, the mixed solution is cooled to the room temperature, and is condensed to the SiO$_2$ concentration of 12% by weight with a ultrafiltration film (produced by Asahi Chemicals Co., Ltd, Microsa 1013). The pH is 9.5. The solution is further condensed with a rotary evaporator to the SiO$_2$ concentration of 40.5% by weight. The obtained particles contents B$_2$O$_3$ by 0.38% by weight. The average particle diameter obtained from image analysis of the TEM image is 54 nm. A result of analysis of the spinous silica particles is shown in Table 3.

Example 28

21 grams of water glass with the silica concentration of 24.3% by weight is added to 127 grams of a sol of silica particles with the average particle diameter of 18 nm calculated from a specific surface area measured by the nitrogen adsorption method and also with the $SiO_2$ concentration of 40.5% (produced by Catalysts & Chemicals Industries Co. Ltd., Cataloid SI-40). The mixed solution is heated to 87 degrees C. and is kept at the temperature for 30 minutes. Then, the mixed solution is kept at the temperature of 87 degrees C., and 2478 grams of an aqueous solution of sodium tetraborate ($Na_2B_4O_7$) with the concentration of 1% by weight and 2478 grams of a silicic acid solution with the $SiO_2$ concentration of 4.88% by weight are simultaneously added to the mixed solution over 14 hours. After completion of the addition, the mixed solution is cooled to the room temperature, and condensed to the $SiO_2$ concentration of 12% by weight with a ultrafiltration film (produced by Asahi Chemicals Co., Ltd, Microsa 1013). The pH is 9.5. The solution is further condensed with a rotary evaporator to the $SiO_2$ concentration of 40.5% by weight. The obtained particles contain $B_2O_3$ by 0.38% by weight. The average particle diameter obtained by image analysis of the TEM image is 35 nm. A result of analysis of the spinous silica particles is shown in Table 3.

TABLE 3

| | | | Ex. 26 | Ex. 27 | Ex. 28 |
|---|---|---|---|---|---|
| Seed[1] Silica Sol | Average Particle Diameter (BET) | nm | 5 | 5 | 18 |
| | Silica Sol Weight | g | 2.3 | 2.3 | 127 |
| | Silica Conc. | % by weight | 20 | 20 | 40.5 |
| | Silica | g | 0.46 | 0.46 | 51.44 |
| Seed[2] Water Glass | Total Amount | g | — | — | 21 |
| | Conc. | % by weight | — | — | 24.3 |
| | Silica | g | — | — | 5.1 |
| Aqueous Solution of Sodium Tetraborate | Total Amount | g | 2,489 | 995 | 2,478 |
| | Conc. | % by weight | 1 | 1 | 1 |
| | $Na_2B_4O_7 \cdot 10H_2O$ | g | 24.89 | 9.95 | 24.8 |
| | | | Water Glass | Water Glass | Silicic Acid Solution |
| | Total Amount | g | 2,489 | 2,986 | 2,478 |
| | Conc. | % by weight | 3 | 3 | 4.9 |
| | Silica | g | 74.66 | 89.6 | 120.9 |
| Seed Silica | | Weight Portion | 100 | 100 | 100 |
| $Na_2B_4O_7 \cdot 10H_2O$ | | Weight Portion | 5,410 | 2,163 | 25 |
| Additional Silica | | Weight Portion | 16,230 | 19,476 | 214 |
| Spinous Silica Sol | D2 | nm | 46 | 54 | 35 |
| | SA2 | $m^2/g$ | 59 | 51 | 78 |
| | SA1 | $m^2/g$ | 106 | 96 | 210 |
| | SA1/SA2 | | 1.8 | 1.88 | 2.69 |
| | Sphericity | | 0.84 | 0.89 | 0.91 |

INDUSTRIAL APPLICABILITY

The sol of spinous silica-based particles according to the present invention represented by a sol of spinous silica particles or by a sol of spinous alumina-silica composite particles is effective as a polishing agent and a composition for polishing, and can be used for mirror-finishing an aluminum disk (aluminum or a plated layer of an aluminum substrate), aluminum wiring on a semiconductor multilayered wiring substrate, a glass substrate for an optical disk or a magnetic disk, a glass substrate for an liquid crystal display, a glass substrate for a photo mask, and other vitreous materials. Furthermore the sol of spinous silica-based particles can be used also as a filler for cast resin products or coating films, a component for cosmetics, an adsorbent, an aggregation promoter, a de-grimy agent, a thickening agent, a soil hardener, and a component of an ink accepting layer.

What is claimed is:

1. A sol of spinous silica-based particles comprising:
   a solvent, and
   spinous silica-based particles dispersed in the solvent, each spinous silica-based particle having a spherical particle and a plurality of verrucous projections on a surface of the spherical particle with a surface roughness value ((SA1)/(SA2)) in a range from 1.7 to 10 wherein SA1 indicates a specific surface area measured by the BET method or the Sears method and SA2 indicates a specific surface area converted from an average particle diameter (D2) measured by the image analysis method and also with the average particle diameter (D2) measured by the image analysis method in a range from 7 to 150 nm.

2. The sol of spinous silica-based particles according to claim 1, wherein the spinous silica-based particles comprise silica or alumina-silica composite.

3. The sol of spinous silica-based particles according to claim 1, wherein sphericity of the spinous silica-based particles is in the range from 0.8 to 1.

4. The sol of spinous silica particles according to claim 1, wherein a coefficient of variation (CV value) of diameters of the spinous silica-based particles is in a range from 10 to 50%.

5. The sol of spinous silica-based particles according to claim 1, wherein the verrucous projections are verrucous concave-convex-shaped projections, and the spinous silica-based particles comprise silica cores which are coated with alumina and silica.

6. A polishing agent comprising the sol of spinous silica-based particles according to claim 1.

7. A composition for polishing containing the sol of spinous silica-based particles according to claim 1.

8. A sol of spinous silica particles comprising:
   a solvent, and
   spinous silica particles dispersed in the solvent, each spinous silica particle having a spherical particle and a plurality of verrucous projections on a surface of the spherical particle with the surface roughness value ((SA1)/(SA2)) in a range from 1.7 to 10 wherein SA1 indicates a specific surface area measured by the BET method or the Sears method and SA2 indicates a specific surface area converted from an average particle diameter (D2) measured by the image analysis method and also with the average particle diameter (D2) measured by the image analysis method in a range from 7 to 150 nm.

9. The sol of spinous silica particles according to claim 8, wherein a coefficient of variation (CV value) of diameters of the spinous silica particles is in a range from 10 to 50%.

10. A polishing agent comprising the sol of spinous silica-based particles according to claim 8.

11. A composition for polishing containing the sol of spinous silica-based particles according to claim 8.

12. A sol of spinous alumina-silica composite particles comprising:
    a solvent, and
    spinous alumina-silica composite particles distributed in the solvent, each spinous alumina-silica composite particle having a spherical silica particle and a plurality of verrucous projections comprising silica and alumina on a surface of the spherical silica particle with the surface roughness value ((SA1)/(SA2)) in a range from 1.7 to 10 wherein SA1 indicates a specific surface area measured by the BET method or the Sears method and SA2 indicates a specific surface area converted from an average particle diameter (D2) measured by the image analysis method and also with the average particle diameter (D2) measured by the image analysis method in the range from 7 to 150 nm.

13. The sol of spinous alumina-silica composite particles according to claim 12, wherein a coefficient of variation (CV value) of diameters of the spinous alumina-silica particles is in a range from 10 to 50%.

14. A polishing agent comprising the sol of spinous silica-based particles according to claim 12.

15. A composition for polishing containing the sol of spinous silica-based particles according to claim 12.

\* \* \* \* \*